United States Patent
Harviainen et al.

(10) Patent No.: US 12,231,483 B1
(45) Date of Patent: Feb. 18, 2025

(54) EXTENDED AND MIXED REALITY EXPERIENCE ADAPTATION, PROCESSING, AND HANDOVER FROM ONE EDGE NODE TO ANOTHER

(71) Applicant: Adeia Guides Inc., San Jose, CA (US)

(72) Inventors: Tatu V. J. Harviainen, Helsinki (FI); Tao Chen, Palo Alto, CA (US); Dhananjay Lal, Englewood, CO (US)

(73) Assignee: Adeia Guides Inc., San Jose, CA (US)

(*) Notice: Subject to any disclaimer, the term of this patent is extended or adjusted under 35 U.S.C. 154(b) by 0 days.

(21) Appl. No.: 18/234,548

(22) Filed: Aug. 16, 2023

(51) Int. Cl.
| | |
|---|---|
| G06F 13/00 | (2006.01) |
| G06F 3/01 | (2006.01) |
| G06T 19/00 | (2011.01) |
| H04L 65/1069 | (2022.01) |
| H04L 65/80 | (2022.01) |

(52) U.S. Cl.
CPC .............. H04L 65/80 (2013.01); G06F 3/016 (2013.01); G06T 19/00 (2013.01); H04L 65/1069 (2013.01); G06T 2200/16 (2013.01); G06T 2210/61 (2013.01)

(58) Field of Classification Search
CPC ..... H04L 65/80; H04L 65/1069; H04L 67/10; G06F 3/016; G06T 19/00; G06T 2200/16; G06T 2210/61
USPC ........ 709/201, 220–222, 227, 228, 217–219, 709/224
See application file for complete search history.

(56) References Cited

U.S. PATENT DOCUMENTS

| | | | |
|---|---|---|---|
| 7,990,374 B2 | 8/2011 | Itkowitz et al. | |
| 11,423,624 B2 * | 8/2022 | Dedonato | G06F 3/011 |
| 11,670,014 B2 * | 6/2023 | Kreiner | G06F 3/012 |
| | | | 345/633 |
| 11,924,216 B2 | 3/2024 | Thomas | |
| 2015/0302665 A1 | 10/2015 | Miller | |
| 2015/0334430 A1 | 11/2015 | Clapp | |
| 2017/0075701 A1 | 3/2017 | Ricci et al. | |
| 2018/0084305 A1 | 3/2018 | Sprenger et al. | |
| 2018/0227063 A1 | 8/2018 | Heubel et al. | |
| 2019/0208007 A1 | 7/2019 | Khalid | |
| 2020/0026354 A1 | 1/2020 | Swindells | |

(Continued)

FOREIGN PATENT DOCUMENTS

WO 2023099233 A1 6/2023

OTHER PUBLICATIONS

Aittala, "Inverse lighting and photorealistic rendering for augmented reality," Visual Computer, 26:669-678 (2010).

(Continued)

Primary Examiner — Kenneth R Coulter
(74) Attorney, Agent, or Firm — Haley Guiliano LLP

(57) ABSTRACT

Methods and systems are described for extended and mixed reality experience adaptation, processing, and handover from one computing or processing entity to another. In response to a change in a condition impacting resource usage, delivery of content is transferred from one edge node to another. One or more changes in a viewing client, a first edge node, a second edge node, a communication network, and content signal a handover. Artificial intelligence systems, including neural networks, and models are trained and developed for improving the adaptation, processing, and handover. Related apparatuses, devices, techniques, and articles are also described.

20 Claims, 15 Drawing Sheets

(56) References Cited

U.S. PATENT DOCUMENTS

| | | | |
|---|---|---|---|
| 2020/0142484 A1 | 5/2020 | Maalouf et al. | |
| 2021/0150818 A1* | 5/2021 | Dedonato | G06T 13/20 |
| 2023/0105481 A1* | 4/2023 | Kreiner | G06F 3/012 |
| | | | 345/633 |
| 2023/0249064 A1 | 8/2023 | Murphy et al. | |
| 2023/0341941 A1 | 10/2023 | Clark et al. | |
| 2023/0410384 A1* | 12/2023 | Pajouh | G06T 11/00 |

OTHER PUBLICATIONS

Anonymous, "ETSI TR 126 928 V17.0.0 (May 2002)," Technical Report, 5G; Extended Reality (XR) in 5G 3GPP TR 26.928 version 17.0.0 Release 17) (2022) (133 pages).

Anonymous, "Get the lighting right," Platform-Specific Guides, Google ARCore Documentation (2023) (13 pages).

Bross et al., "Overview of the Versatile Video Coding (VVC) Standard and its Applications," IEEE Transactions on Circuits and Systems for Video Technology, 31(10):3736-3764 (2021).

Lai et al., "Furion: Engineering High-Quality Immersive Virtual Reality on Today's Mobile Devices," Paper Session VIII: Frameworks and Such, MobiCom'17, Oct. 16-20, 2017 (13 pages).

Ohlsson et al., "Reducing mobility interruption time in 5G networks," Ericsson Blog, Apr. 2, 2020 (9 pages).

Qualcomm Technologies, Inc., "Boundless XR and cloud gaming over 5G," QCCOMResearch (2021) (33 pages).

Rehman et al., "A Survey of Handover Management in Mobile HetNets: Current Challenges and Future Directions," Applied Sciences, 13(5):3367 (2023).

Siriwardhana et al., "A Survey on Mobile Augmented Reality With 5G Mobile Edge Computing: Architectures, Applications, and Technical Aspects," IEEE Communications Surveys & Tutorials, 23(2):1160-1192, Secondquarter 2021.

Wang et al., "Learning Indoor Inverse Rendering with 3D Spatially-Varying Lighting," ICCV 2021 open access, Proceedings of the IEEE/CVF International Conference on Computer Vision (ICCV), 2021, pp. 12538-12547 (10 pages).

Xia, "New advances for haptic rendering: state of the art," The Visual Computer 34.2, 271-287 (2018).

"Common Test Conditions for MPEG Immersive Video", ISO/IEC JTC 1/SC29/WG04, N0203, Apr. 29, 2022.

"IEEE SA Standards Association—IEEE SA Beyond Standards", retrieved at https://standards.ieee.org/beyond-standards/, on Jun. 20, 2023.

"Immersion | Author Archives: Chris Ullrich", retrieved at https://www.immersion.com/author/cullrich/, on Jun. 20, 2023.

"The Haptics Industry Forum", retrieved at https://hapticsif.org/, Jun. 20, 2023.

Bastian, Matthias, "OpenXR aims to standardize 'advanced haptics' for VR and AR", retrieved at https://mixed-news.com/en/openxr-aims-to-standardize-advanced-haptics-for-vr-and-ar/, Mar. 12, 2022.

Evans, Alun, et al., "A pipeline for the creation of progressively rendered web 3D scenes", Multimedia Tools and Applications, Jan. 28, 2017.

Kroon, Bart, "Call for MPEG immersive video test materials", retrieved at https://mpeg-miv.org/index.php/2022/05/11/call-for-mpeg-immersive-video-test-materials/, May 11, 2022.

Lavoue, Guillaume, et al., "Streaming Compressed 3D Data on the Web using JavaScript and WebGL", In: Proceedings of the 18th international conference on 3D web technology. ACM, 2013, 19-27.

Salisbury, Kenneth, et al., "Haptic Rendering: Introductory Concepts", IEEE Computer Graphics and Applications, 2004, 24-32.

Verschoor, M., et al., "Tactile Rendering Based on Skin Stress Optimization", ACM Trans. Graph., vol. 39, No. 4, Jan. 13, 2020.

Zampoglou, Markos, et al., "Adaptive streaming of complex Web 3D scenes based on the MPEG-DASH standard", Multimedia Tools and Applications, 77.1, 2016, 125-148.

U.S. Appl. No. 18/214,279, filed Jun. 26, 2023, Tatu V.J. Harviainen.
U.S. Appl. No. 18/214,283, filed Jun. 26, 2023, Tatu V.J. Harviainen.
U.S. Appl. No. 18/518,017, filed Nov. 22, 2023, Tatu V.J. Harviainen.
U.S. Appl. No. 18/518,023, filed Nov. 22, 2023, Tatu V.J. Harviainen.

Anonymous, "ARcore", [Retrieved from https://developers.google.com/ar] (8 Pages).

Anonymous, "Augmented Reality-More to explore with ARKit 6", (Apple Inc) [Retrieved from: https://developer.apple.com/augmented-reality/arkit/] (4 pages).

Baroffio, Luca, et al., "Coding local and global binary visual features extracted from video sequences", IEEE Transactions on Image Processing, vol. 24, No. 11, pp. 3546-3560, Nov. 2015, (https://ieeexplore.ieee.org/abstract/document/7122888).

Li, Guangqiang, et al., "A deep-learning real-time visual SLAM system based on multi-task feature extraction network and self-supervised feature points", (Jan. 2021) (https://www.sciencedirect.com/science/article/abs/pii/S0263224120309374).

Ma, Jiayi, et al., "Image Matching from Handcrafted to Deep Features: A Survey", Int J Comput Vis 129, 23-79 (2021). https://doi.org/10.1007/s11263-020-01359-2 (167 pages).

Mehrabi, Abbas, et al., "Multi-Tier CloudVR: Leveraging Edge Computing in Remote Rendered Virtual Reality", ACM Transactions on Multimedia Computing, Communications, and Applications vol. 17 Issue 2 Article No. 49 pp. 1-24 (https://doi.org/10.1145/3429441).

Qu, Q., et al., "A Comprehensive Review of Machine Learning in Multi-objective Optimization", (2021 IEEE 4th International Conference on Big Data and Artificial Intelligence) (BDAI), (Qingdao, China), (2021, pp. 7-14).

E. Gatti., et al., "Haptic Rules! Augmenting the gaming experience in the traditional games: The case of Foosball," Jun. 1, 2017 IEEE World Haptics Conference, 432-435 (2017).

J. Sachs, et al., "Adaptive 5G Low-Latency Communication for Tactile Internet Services," Proceedings of the IEEE, 107(2):354-349 (2018).

J.-M. Lim et al., "An Audio-Haptic Feedbacks for Enhancing User Experience," IEEE international Conference on Consumer Electronics, 49-50 (2013).

M. Gaudina et al., "Virtual Social Multimedia Streaming with a Novel Haptic Device," Proceedings of the 35th International Convention MIPRO, 1009-1016 (2012).

* cited by examiner

EXTENDED AND MIXED REALITY EXPERIENCE ADAPTATION, PROCESSING, AND HANDOVER FROM ONE EDGE NODE TO ANOTHER

FIELD OF THE INVENTION

The present disclosure relates to content consumption and control of media. The media includes extended reality (XR) sessions including augmented reality (AR), three-dimensional (3D) content, four-dimensional (4D) experiences, next-generation user interfaces (next-gen UIs), virtual reality (VR), mixed reality (MR), interactive experiences, and the like.

SUMMARY

XR experiences are typically resource intensive. Current wireless mobile networks are not capable of providing sufficient bandwidth, processing, and latency for XR applications. Current approaches towards providing low-latency networks, server-side rendering, and streaming of XR experiences encounter problems with resource management and mobile operation. XR solutions such as Nvidia CloudXR, Meta Quest, Varjo Reality Cloud, Azure Remote Rendering, and Google Cloud's Immersive Stream for XR provide basic functionality of offloading XR rendering from a client side to a server side. However, in the case of server-side rendering of the XR experiences, adaptation of the experience to environmental conditions that differ from client to client requires server-side processing. Adaptation of XR content that is handled on the client side creates problems for users, particularly users in motion.

In some approaches, XR streaming focuses on managing a split of XR rendering between a server device and a client device. However, such split rendering is performed without consideration of challenges created by adapting the XR content to the environmental conditions on the client side. With multiple clients, even without complex adaptation to the detailed environmental conditions, running a centralized rendering and streaming service remains challenging.

A need has arisen to overcome the limitations of these approaches.

In order to support XR experience adaptation on a server side, methods and systems for communicating rules for adapting to environmental conditions are provided. In accordance with the rules of adaptation, content is adapted, defined, and implemented to achieve optimal system performance and user experiences.

With streaming of XR content, adaptation on a sensor side and/or on a client side is provided. In addition, dynamic responsiveness to operating conditions is provided. XR devices are configured for use while a user is in motion. Improved XR session management is provided to address technical challenges arising from user movement in the XR ecosystem. XR streaming session management is configured for a smooth handover of XR processing from one edge node to another as a location of the user changes.

Seamless integration of XR content with the physical environment where the content is being consumed is provided. The seamless integration is achieved with detection and collection of environmental conditions. Also, complex adaptation of the content is provided to improve the integration.

On the client side, features for adapting XR content layout to physical environment geometry are provided. The adaptation of the XR content includes virtual lighting according to real lighting in the real environment. Also, adaptation of the XR content to rendering capabilities of the particular client device in use is provided.

Improved streamed XR experiences are delivered for consumption with content adaptation. In some embodiments, selected processing is offloaded to one or more edge nodes. Offloading is performed for users on the move. A handover of the XR session is carefully managed between edge nodes. The delivery of a smooth handover of an XR experience with content adaptation is achieved by communication adaptation of the XR content states between edge nodes, as well as signaling between entities. Seamless handover is provided without abrupt changes in the XR experience.

For achieving an optimal XR experience, XR content is adapted to a large range of conditions. The XR experience layout avoids conflicts and improves semantic mapping. For example, virtual elements are aligned for logical placement within the real, physical environment. Lighting of the XR experience is adjusted to match lighting of the real environment. Simulated light transport between virtual and real environments is provided. XR content is adjusted to match other environmental conditions, e.g., wind, rain, and the like. For embodiments involving video see-through and/or pass-through MR, rendering of virtual content is provided at a same visual quality as cameras providing a real-world view. For MR experiences, virtual content and features of a real, physical environment are mixed seamlessly. The MR experiences are optimized with one or more improved processes. An XR experience layout is adjusted to match a real-world layout. For embodiments involving optical see-through AR, brightness levels are adapted, rendered, and output to match illumination of the real environment. The illumination of the real environment is estimated from devices capturing the real environment. The content is adapted for client devices having haptics feedback capabilities.

Seamless session handover is provided. In some embodiments, the seamless handover is achieved by storing and maintaining adaptation and XR scene state information on an edge node. Scene states are, for example, configurations that are saved for an object or scene, and they store multiple attributes. When the scene state is applied, all of its attributes will be applied to the scene. In some embodiments, the adaptation and XR scene state information are stored in a format that is transmitted to a new edge node when a session handover is needed. In addition to data management improvements, signaling between entities ensures handover without abrupt changes in the XR experience.

An overall architecture of a distributed XR experience is provided. Details of processing for the session handover are provided.

The present invention is not limited to the combination of the elements as listed herein and may be assembled in any combination of the elements described herein.

These and other capabilities of the disclosed subject matter will be more fully understood after a review of the following figures, detailed description, and claims.

BRIEF DESCRIPTIONS OF THE DRAWINGS

The present disclosure, in accordance with one or more various embodiments, is described in detail with reference to the following figures. The drawings are provided for purposes of illustration only and merely depict non-limiting examples and embodiments. These drawings are provided to facilitate an understanding of the concepts disclosed herein and should not be considered limiting of the breadth, scope, or applicability of these concepts. It should be noted that for clarity and ease of illustration these drawings are not necessarily made to scale.

The embodiments herein may be better understood by referring to the following description in conjunction with the accompanying drawings, in which like reference numerals indicate identical or functionally similar elements, and in which.

The drawings are intended to depict only typical aspects of the subject matter disclosed herein, and therefore should not be considered as limiting the scope of the disclosure. Those skilled in the art will understand that the structures, systems, devices, and methods specifically described herein and illustrated in the accompanying drawings are non-limiting embodiments and that the scope of the present invention is defined solely by the claims.

DETAILED DESCRIPTION

Figure 1:
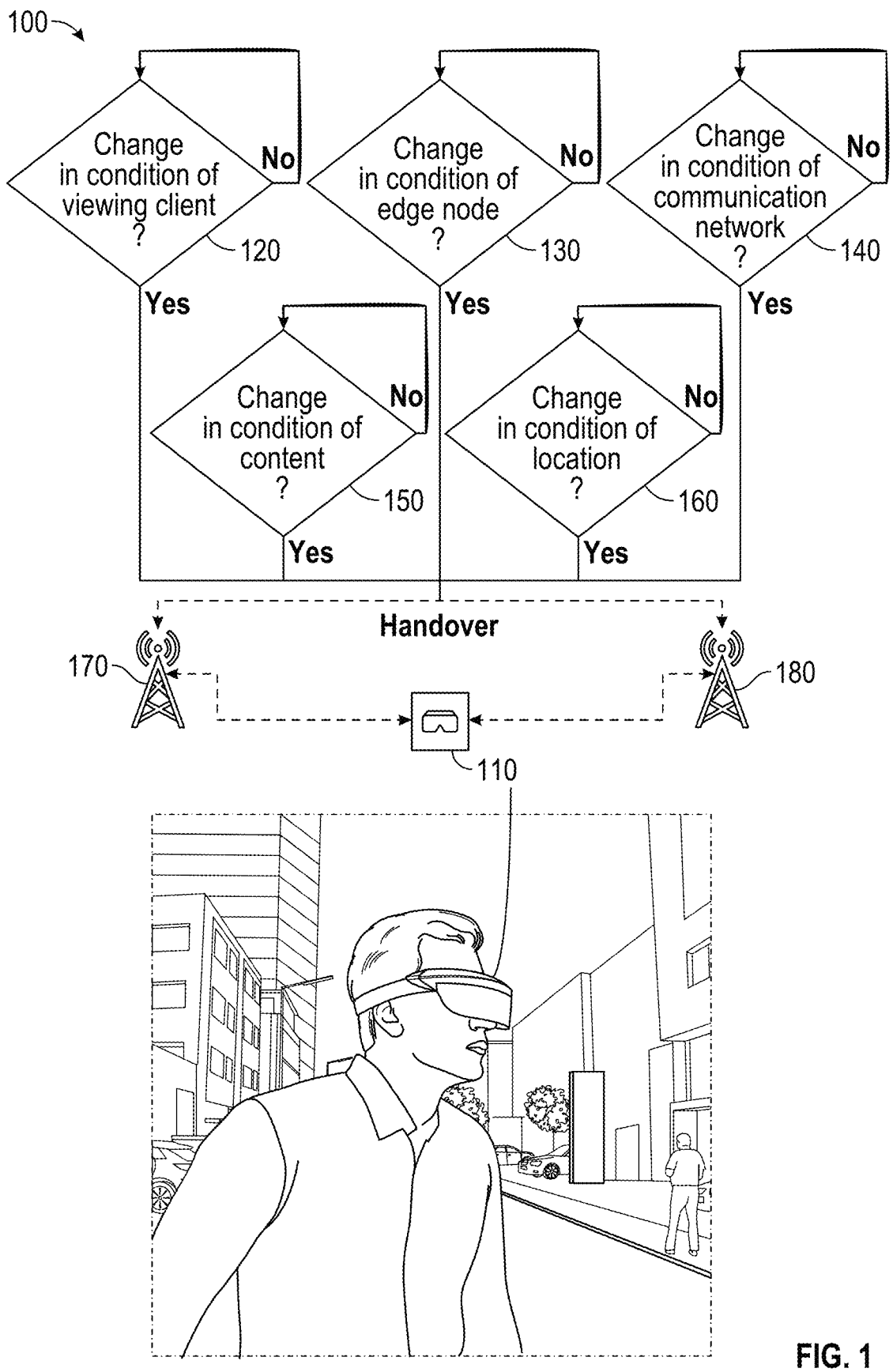
FIG. 1 depicts a user walking through a city wearing an XR device during a handover between a first edge node and a second edge node, in accordance with some embodiments of the disclosure.

Streaming of XR content requires per client, real-time rendering and low latency. Edge processing delivers low latency for XR streaming. FIG. 1 illustrates a scenario 100 in which a user is walking through a city. The user is wearing an XR device 110, such as smart glasses configured for an MR experience delivering a combination of real and virtual imagery. As the user walks through the city, in order to deliver a high-quality, real-time, and low-latency experience to the XR device 110, a seamless partial or complete handover is provided for transfer of computing, for example, from a first edge node 170 to a second edge node 180. In the context of the present specification, the term "handover" refers to a process of transferring a portion or an entirety of an ongoing computing or processing step (e.g., rendering of a 3D object for display) from one computing or processing entity (e.g., an edge node) to another. A handover is also known as a handoff or transfer.

The disclosure is not limited to XR. The present disclosure also relates to processing of information, where a processor is resident in a mobile object (e.g., a vehicle) and tasked with relatively high computational load. Mobile processing includes applications to computer vision, object recognition, obstacle avoidance, and the like. In some embodiments, a partial or complete handover of processing occurs in response to a change in a condition of at least one of a viewing client, an edge node, a communication network, content, combinations of the same, or the like.

The handover is made in response to a change in condition of at least one entity of a plurality of entities involved in delivering the XR experience. In some embodiments, the partial or complete handover occurs in response to at least one of a change in a condition of a viewing client 120 (120="Yes"), a change in a condition of an edge node 130 (130="Yes"), a change in a condition of a communication network 140 (140="Yes"), a change in a condition of content 150 (150="Yes"), a change in a condition of a location 160 (160="Yes"), combinations of the same, or the like. If no change in condition is detected (120, 130, 140, 150, 160="No"), then each entity continues to be monitored for a change.

Although examples are given with respect to XR, AR, 3D, 4D, next-gen UIs, VR, MR, interactive experiences, and the like, it is understood that the present methods and systems are provided for other types of content experiences including mobile processing (e.g., computer vision, object recognition, obstacle avoidance, and the like), mobile content delivery, streaming audio, streaming video, or any type of content delivery, communication, distributed computing, and/or low-latency function. Furthermore, the present methods and systems are provided for edge, cloud, and fog computing environments, combinations of the same, and the like.

Figure 2:
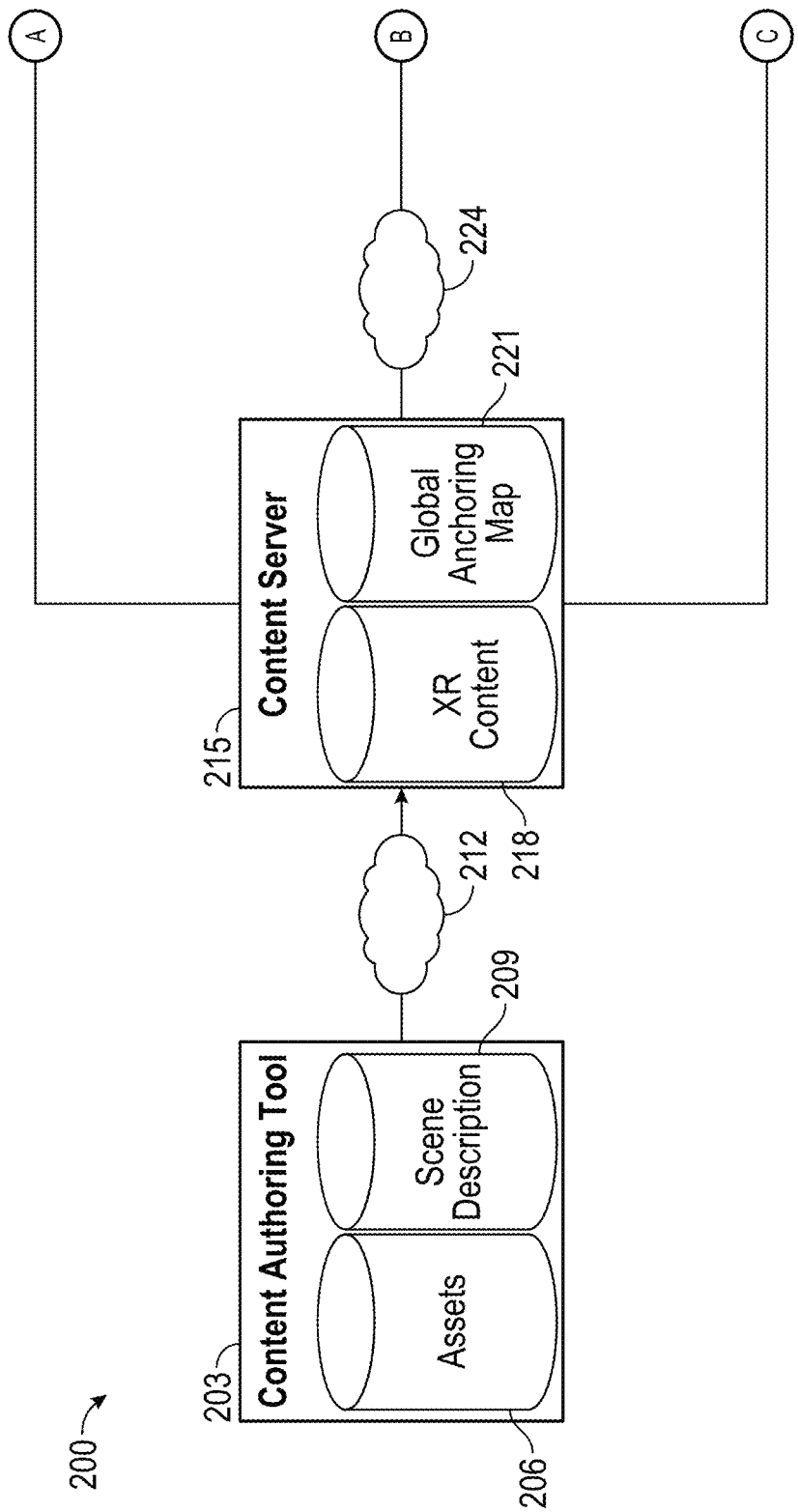
FIG. 2 depicts a system including a content authoring tool, a content server, a plurality of edge nodes, and a viewing client, in accordance with some embodiments of the disclosure.
Figure 2:
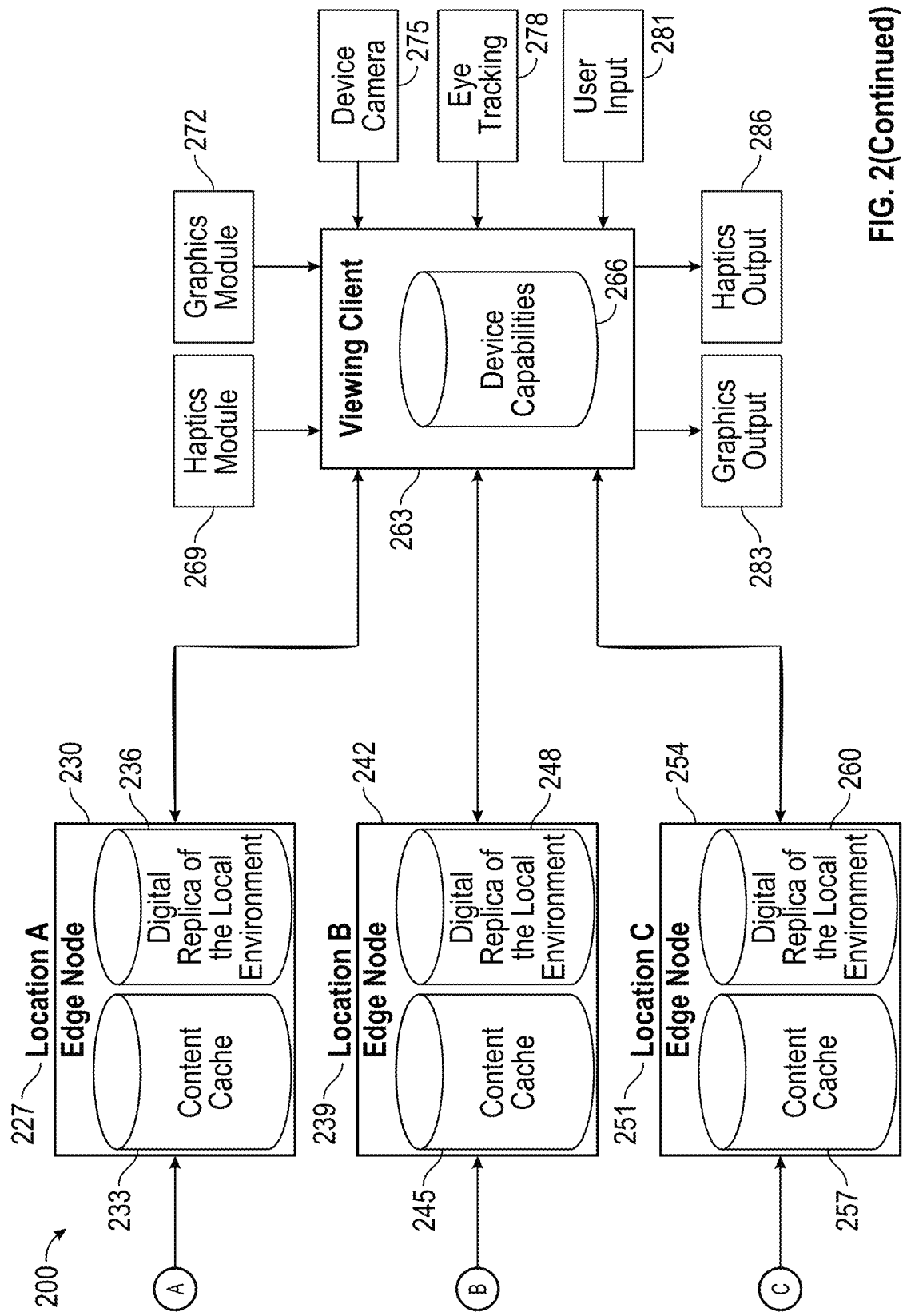

A streaming XR system 200, such as that shown in FIG. 2, provides for seamless partial or complete handover and delivery of the high-quality, real-time, and low-latency experience to XR devices. In various embodiments, the handover is performed utilizing at least one, more, or all of related processes and state diagrams 300, 400, 500, 600, 700, 800, 1000, or 1100, shown, for example, in FIGS. 3, 4, 5, 6, 7, 8, 10, and 11, respectively. Video compression is provided, in some embodiments, over time in a manner shown in FIG. 9. At least one of the features of FIGS. 1-11, combinations of the same, or the like, is performed with at least one of an artificial intelligence system 1200 and a communication system 1300 of FIGS. 12 and 13, respectively, in some embodiments.

FIG. 2 illustrates entities of the streaming XR system 200 for delivering a high-quality, real-time, and low-latency streaming XR experience. The system 200 is configured for operation with various types of computational entities. A handover between two or more nodes is provided. The handover is impacted by at least one of a distance to the node, a load on an entity of the system (e.g., a node, a client, a server, a communications system, content, and the like), a number of objects being rendered, one or more capabilities of a viewing client, one or more capabilities of a processor (e.g., an edge node), system traffic levels, computational limits, combinations of the same, or the like.

In some embodiments, the system 200 is configured for edge processing of XR experiences. In some embodiments, the system 200 is configured for complex data communication between a content authoring tool 203, a content server 215, at least one edge node 230, 242, 254, and a viewing client 263. Content adaptation is provided for session conditions to deliver a complex distributed process. The system 200 is configured to perform under varying conditions at a client device. For example, the system 200 is configured to maintain and communicate a state of adaptation between nodes when the client device moves from a vicinity of one edge computing node to another. The state of the adaptation between nodes is provided to ensure optimal quality of experience and to enable a seamless handover of a session from one edge node to another when the user is on the move. In some embodiments, a determination, prediction, or likelihood that the handover or related events will occur at a future time is provided. For example, the determination, prediction, or likelihood that an XR device is approaching an outer range of one edge node, and/or approaching a vicinity of a next edge node, or the like, is provided.

For example, the system accesses a schedule and/or location history of a user device and determines that the user device travels from home to work at a particular time of day and regularly generates an MR experience at this time. Based on this determination, prediction, or likelihood, the system prepares the device for one or more handovers between edge nodes, e.g., performs pre-processing of one or more scenes that are likely to be encountered along a regular commuting path, or other related functions. The determination, prediction, or likelihood is performed by one or more of the predictive models disclosed herein (e.g., system 1200). Such determination, prediction, or likelihood improves the performance of the device and the user experience.

In some embodiments, communication between the content authoring tool 203 and the content server 215 is performed via a cloud-based communication system 212, and communication between the content server 215 and one or more edge nodes is performed via a cloud-based communication system 224. The system 212 and the system 224 are integrated into a single system in some embodiments.

In some embodiments, the system 200 is configured to modify, at a first edge node 230, a content cache 233 and a digital replica 236 of a local environment based on extended reality (XR) content 218 and a global anchoring map 221. The system 200 is configured to transmit, from the first edge node 230, the content cache 233 and the digital replica 236 of the local environment to the viewing client 263. The system 200 is configured to, in response to a change in a condition of the viewing client 263, transfer the modifying of the content cache 233 and the digital replica 236 of the local environment based on the XR content 218 and the global anchoring map 221 from the first edge node 230 to a second edge node 242. The change in the condition of the viewing client 263 includes determining that the viewing client 263 is moving from a first vicinity of the first edge node 230 to a second vicinity of the second edge node 242.

The second edge node 242 is similarly configured to the first edge node 230 in some embodiments. The second edge node 242 is configured to modify a content cache 245 and a digital replica 248 of the local environment based on the XR content 218 and the global anchoring map 221. The second edge node 242 is configured to transmit the content cache 245 and the digital replica 248 of the local environment to the viewing client 263.

A third edge node 254 is similarly configured to the first edge node 230 and the second edge node 242 in some embodiments. The third edge node 254 is configured to modify a content cache 257 and a digital replica 260 of the local environment based on the XR content 218 and the global anchoring map 221. The third edge node 254 is configured to transmit the content cache 257 and the digital replica 260 of the local environment to the viewing client 263.

In some embodiments, the content authoring tool 203 is configured to generate an asset 206 and a scene description 209. The content authoring tool 203 is configured to transmit the asset 206 and the scene description 209 to the content server 215. The content server 215 is configured to generate the XR content 218 and the global anchoring map 221 based on the asset 216 and the scene description 209.

Before a transfer from the first edge node 230 to the second edge node 242 (or any other edge node) occurs, the content server 215 is configured to transmit the XR content 218 in accordance with the global anchoring map 221 to the first edge node 230. After the transfer from the first edge node 230 to the second edge node 242 (or any other edge node) has occurred, the content server 215 is configured to transmit the XR content 218 in accordance with the global anchoring map 221 to the second edge node 242. The first edge node 230, the second edge node 242, and the third edge node 254 are located at Location A 227, Location B 239, and Location C 251, respectively, in some embodiments.

In some embodiments, the viewing client 263 is configured to monitor device capabilities 266. At least one of a haptics module 269, a graphics module 272, a camera module 275, an eye tracking module 278, or a user input module 281 is configured to communicate with the viewing client 263. The viewing client 263 is configured to monitor device capabilities of the at least one of the haptics module 269, the graphics module 272, the camera module 275, the eye tracking module 278, or the user input module 281. The viewing client 263 is configured to transmit output to at least one of a graphics output module 283 or a haptics output module 286.

Figure 3:
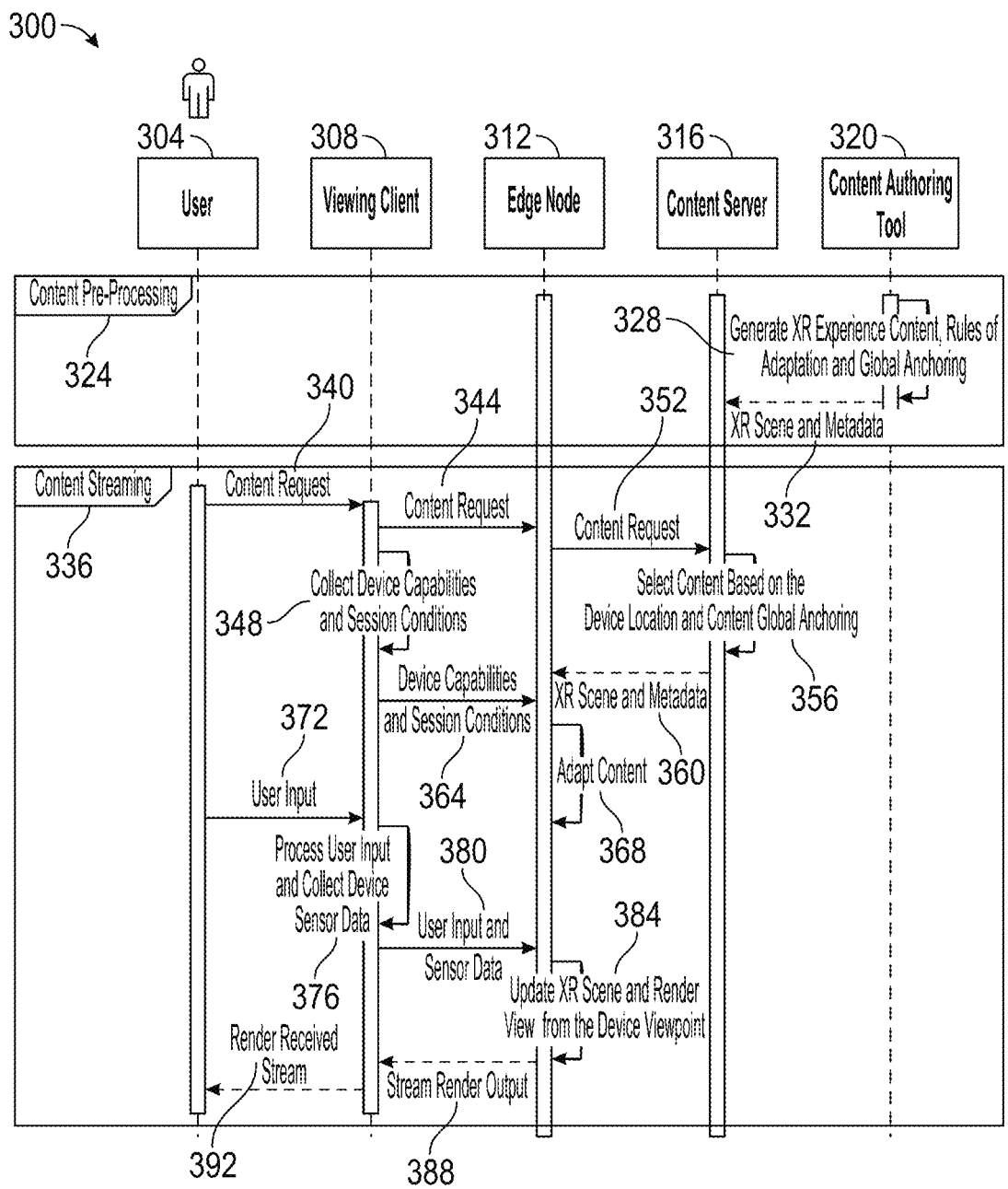
FIG. 3 depicts a state diagram including a user, a viewing client, an edge node, a content server, and a content authoring tool, in accordance with some embodiments of the disclosure.

FIG. 3 illustrates a sequence 300 of communication in some embodiments. The sequence 300 of communication includes communications between a user 304, a viewing client 308 (e.g., 263, 1003), an edge node 312 (e.g., 230, 242, 254, 1006, 1009, etc.), a content server 316 (e.g., 215, 1015), and a content authoring tool 320 (e.g., 203). Details of a session handover between two edge nodes are omitted in FIG. 3; however, such details are provided in the Session Handover section herein (starting at paragraph [0080]). That is, in FIG. 3, the illustrated edge node 312 is the node (or at least one of a plurality of nodes) currently in communication with the viewing client.

In some embodiments, the sequence 300 includes content pre-processing 324. The content pre-processing 324 includes generating 328, at the content authoring tool 320, XR content (e.g., 218), rules of adaptation, and a global anchoring map (e.g., 221). The content pre-processing 324 includes generating, at the content authoring tool 320, XR scene data and metadata based on the XR content, the rules of adaptation, and the global anchoring map. The content pre-processing 324 includes transmitting 332, from the content authoring tool 320, the XR scene data and the metadata to the content server 316.

In some embodiments, the sequence 300 includes content streaming 336. The content streaming 336 includes receiving 340, at the viewing client 308, a content request from the user 304. The content streaming 336 includes transmitting 344 the content request from the viewing client 308 to the edge node 312. The content streaming 336 includes, in response to receiving the content request, collecting 348, at the viewing client 308, device capabilities (e.g., 266) and session conditions. The content streaming 336 includes receiving user input from the user 304 (not shown). The content streaming 336 includes transmitting 372 the user input from the user 304 to the viewing client 308. The content streaming 336 includes, in response to receiving the user input, processing 376, at the viewing client 308, the user input, and collecting device sensor data. The content streaming 336 includes transmitting 364, from the viewing client 308, the device capabilities (e.g., 266), and the session conditions to the edge node 312. That is, the transmitting 364 occurs between the viewing client 308 and the first edge node (e.g., 230) when transferring has not occurred, or between the viewing client 308 and the second edge node (e.g., 242) when transferring has occurred. The content streaming 336 includes transmitting 380, from the viewing client 308, the user input and the sensor data to the edge node 312. That is, the transmitting 380 occurs between the viewing client 308 and the first edge node (e.g., 230) when transferring has not occurred, or between the viewing client 308 and the second edge node (e.g., 242) when transferring has occurred.

The content streaming 336 includes adapting 368, at the edge node 312 or the second edge node, the XR content (e.g., 218). The content streaming 336 includes transmitting 352, from the edge node 312, the content request to the content server 316. The content streaming 336 includes selecting 356, at the content server 316, the XR content based on a location of the user device and the global anchoring map (e.g., 221). The content streaming 336 includes transmitting 360, from the content server 316, the XR scene data and the metadata to the edge node 312. The content streaming 336 includes updating 384, at the edge node 312, the XR scene data, and rendering a view from a standpoint of the user device. The content streaming 336 includes transmitting 388, from the node 312, streaming output to the viewing client 308. The content streaming 336 includes transmitting 392 from the viewing client 308, the streaming output to the user device.

Content Authoring

XR content to be distributed using a streaming approach is created by a content author with typical content authoring tools (e.g., 203, 320). The content authoring tools (e.g., 203, 320) include, for example, 3D animation and modeling software, image editing software, and the like. The content authoring tool is used for creating the 3D assets, which are then imported to a real-time 3D scene editor. In the real-time 3D scene editor, a content author builds the XR experience by combining imported 3D assets, audio files, material definitions, and the like.

The content author also defines rules of interaction of elements and user input controls that form a logical structure for the interactive experience. The content author also controls the creation of data that is needed for content adaptation. The content author and content authoring tools create data required for several types of adaptation. The types of adaptation include lighting models, material fidelity, and haptics rendering assets at varying complexity levels. For defining the adaptation conditions, the content author utilizes predefined condition sets, simulation, and/or testing and validation in a test environment.

The content author completes scene construction by assembling a scene from the 3D assets and defining the logic used by the experience. Then, the real-time 3D scene editor exports the experience to a run-time format. In the run-time format, data needed for distributing the experience is packaged so that it is uploaded to a server, and the server distributes the data as a package or by streaming individual elements of the package to edge-processing nodes (e.g., 230, 242, 254, etc.). In the case of XR experiences, run-time data includes different versions of graphics, audio, haptics, assets, scene graphs, and the like describing the scene structure, associated logic, and the like. The content also utilizes global anchoring to link the content with one or more specific real-world locations. In embodiments where global anchoring (e.g., global anchoring map 221) is used, the content author defines one or more real-world locations and links the content to the real-world locations. A real-world location is, for example, a specific location, such as a unique building or landmark that is static. An area in and around the real-world location also includes dynamic objects, such as vehicles. In some embodiments, the location is generic, and/or a semantic location class, such as a kitchen. With the semantic location class, a semantic type of the environment is used as an anchoring condition. In addition to specific and general locations, specific objects are utilized as anchors in some embodiments, and some objects are dynamic.

In order to control the adaptation and to ensure the original artistic intent, the content author defines rules for performance of the content adaptation. The adaptation rules are distributed as a separate data file or embedded with the XR experience, e.g., in a scene graph. The adaptation rules define, for example, parts of scene lighting to be replaced with real environment lighting; parts of the scene that are moved and/or modified; boundaries to accommodate features of a real, physical environment geometry; real-world conditions, such as weather, that impact the assets or XR scene conditions; and the like. The adaptation rules also set priorities for the adaptation. The adaptation priorities of the XR scene provide realistic integration to real-world conditions and ensure high-quality experiences.

Content Server

The content server (e.g., 215, 316, 1015) is a centralized data storage for the XR content in the cloud. The content server distributes specific XR scene contents for downstream processing on edge nodes, which are based on the content requests from the edge nodes. The content server manages global anchoring of the content, which is used to define linkage between specific XR content and physical locations. The content is requested either by specifying the XR content by using specific content identification, or by requesting content based on the location.

Figure 4:
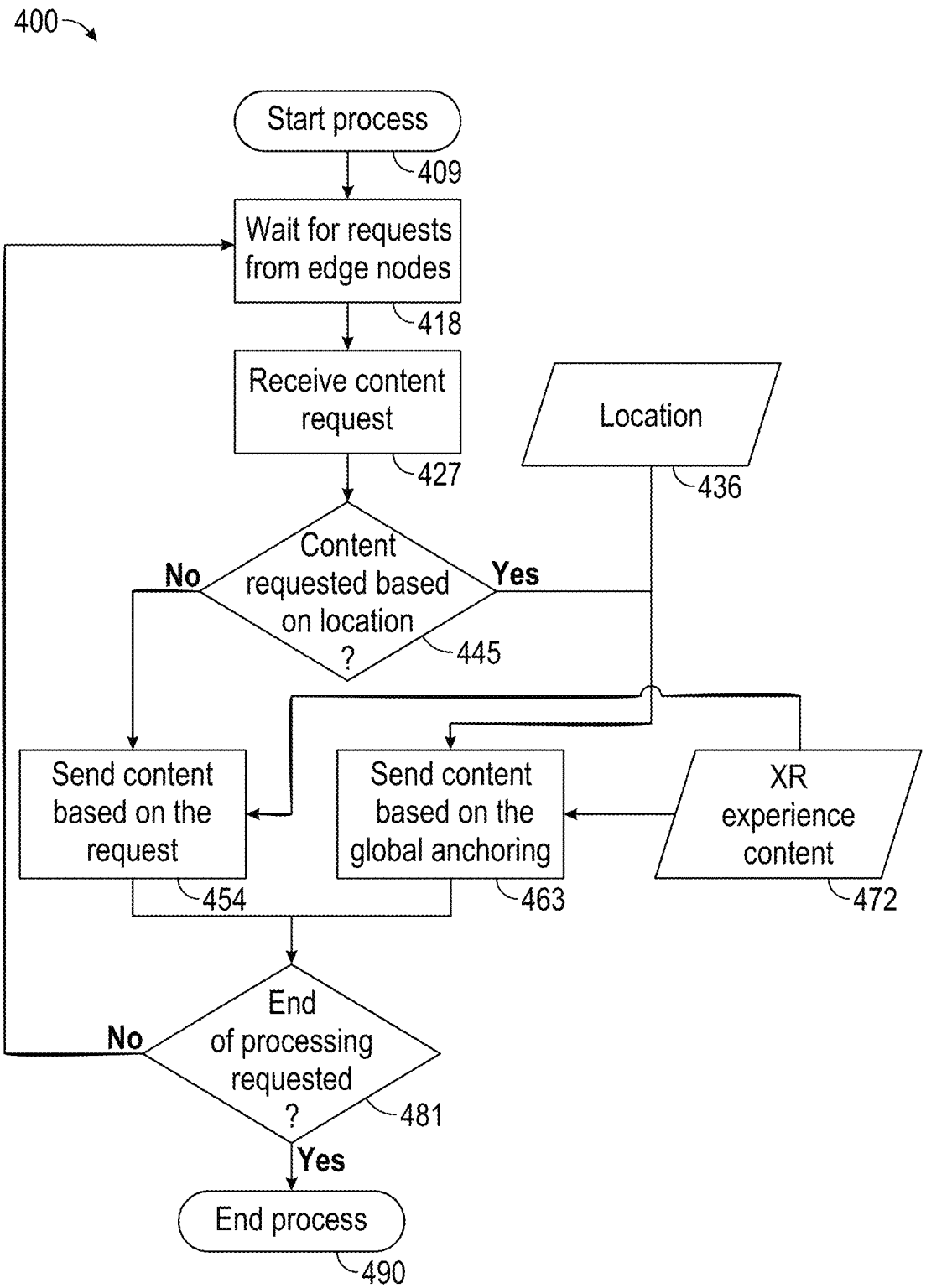
FIG. 4 is a flowchart of a process for a content server, in accordance with some embodiments of the disclosure.

FIG. 4 illustrates a process 400 executed by the content server (e.g., 215, 316, 1015). The process 400 includes starting 409 the process 400. The process 400 includes waiting 418 for requests from edge nodes (e.g., 230, 242, 254, 312, 1006, 1009, etc.). The process 400 includes receiving 427 a content request. The process 400 includes determining 445 whether the content request is based on a location 436 (e.g., Location A 227, Location B 239, Location C 251). The process 400 includes, in response to determining that the content request is based on the location (445="Yes"), sending 463 XR experience content 472 (e.g., 218) based on the global anchoring map (e.g., 221). The process 400 includes, in response to determining that the content request is not based on the location (445="No"), sending 454 the XR experience content 472 based on the content request. The process 400 includes determining 481 whether an end of processing is requested. The process 400 includes, in response to determining that the end of processing is not requested (481="No"), returning the process 400 to the waiting 418 step. The process 400 includes, in response to determining that the end of processing is requested (481="Yes"), ending 490 the process 400.

Edge Node

In some embodiments, the edge node (e.g., 230, 242, 254, 312, 1006, 1009, etc.) is a multi-access edge computing (MEC) server as is defined for 5G networks. In other embodiments, the edge node is any other server that is close to a client device and that serves as an edge-processing node. The client connects to the edge node over a radio access network (RAN) in the case of 5G, or over a Wi-Fi connection, for example.

The edge node is configured to perform XR content processing. In some embodiments, a spatial computing server (SCS) (e.g., 554, 635, 850) runs as a separate process on the edge node. The SCS collects data from multiple sources and processes the collected data to create spatial maps of an area covered by the edge node. The edge node continuously collects data from any device in some embodiments. It is not necessary for the XR client to provide environment data to the SCS during run-time. In embodiments where the XR client does not provide environment data, the SCS has environment maps available for the XR client. The environment maps provide description of at least one of the environment geometry, lighting, visual appearance, materials, semantic object data, combinations of the same, or the like. The SCS creates the environment maps from data such as depth data, point clouds and optical fiducial markers streamed by the client devices or any other source, e.g., sensors embedded in the environment, dedicated scanning sessions, 3D design data, and the like. The SCS provides environment mapping data to the clients that connect to the edge node. In XR embodiments, data provided by the SCS is used for assisting in localization and tracking of the client device, as well as in content adaptation to the physical environment.

The edge node downloads the XR scene based on the identification or pointed out by the server based on the location match. An executable file is downloaded by the edge node from the content server in some embodiments. Adaptation rules are specified in the executable file. The downloaded XR scene or executable file is stored in a local cache by the edge node.

Figure 5:
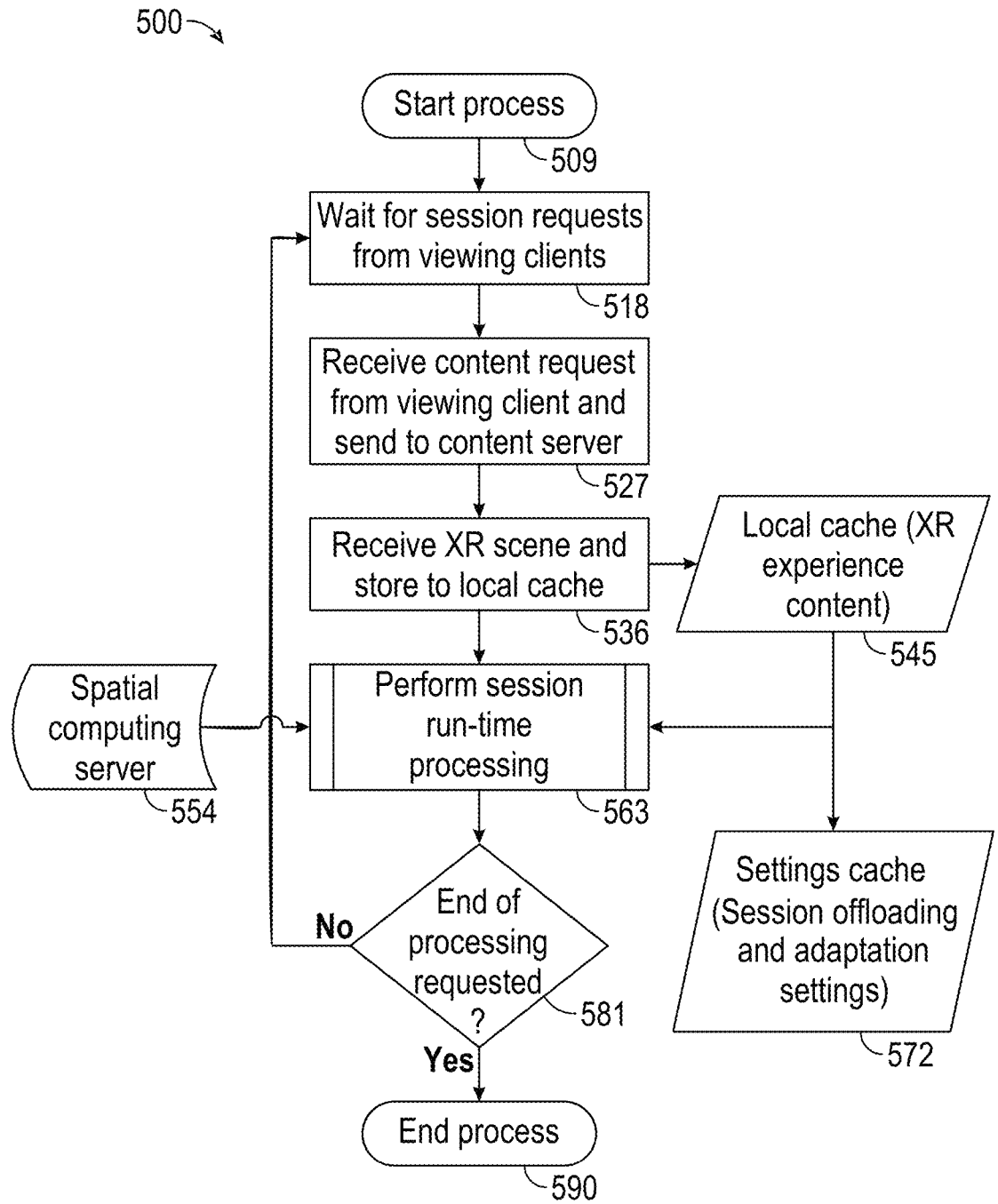
FIG. 5 is a flowchart of a process for an edge node, in accordance with some embodiments of the disclosure.

FIG. 5 illustrates a process 500 executed by the edge node in some embodiments. The process 500 includes starting 509 the process 500. The process includes waiting 518 for viewing client connections, e.g., session requests from viewing clients. The viewing client requests a connection together with the request. The process 500 includes receiving 527 content from the viewing client, e.g., based on the identification or location, and sending the content request to the content server. The process 500 includes receiving 536 an XR scene and storing the XR scene to a local cache 545. The local cache 545 is configured to share information with a settings cache 572. The local cache 545 and the settings cache 572 are configured to provide information for run-time processing. The process 500 includes performing 563 session run-time processing. The SCS (e.g., 554, 635, 850) provides input data for performing 563 session run-time processing in some embodiments. The process 500 includes determining 581 whether an end of processing is requested. The process 500 includes, in response to determining that the end of processing is not requested (581="No"), returning the process 500 to the waiting 518 step. The process 500 includes, in response to determining that the end of processing is requested (581="Yes"), ending 590 the process 500. Once the XR content is downloaded and stored to the local cache, the edge node proceeds to execute session run-time processing illustrated, for example, in FIG. 6.

Figure 6:
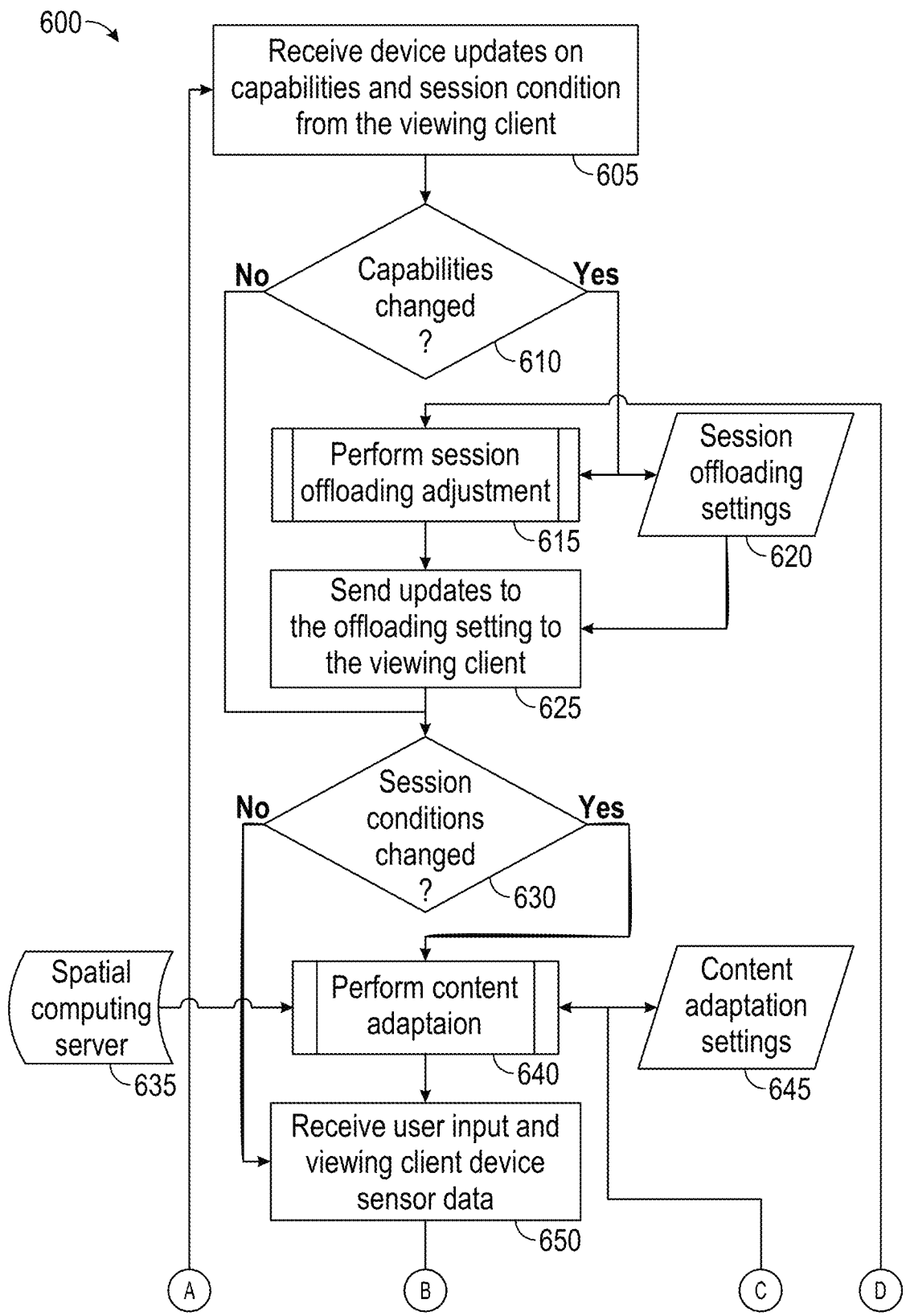
FIG. 6 is a flowchart of a run-time process for an edge node, in accordance with some embodiments of the disclosure.
Figure 6:
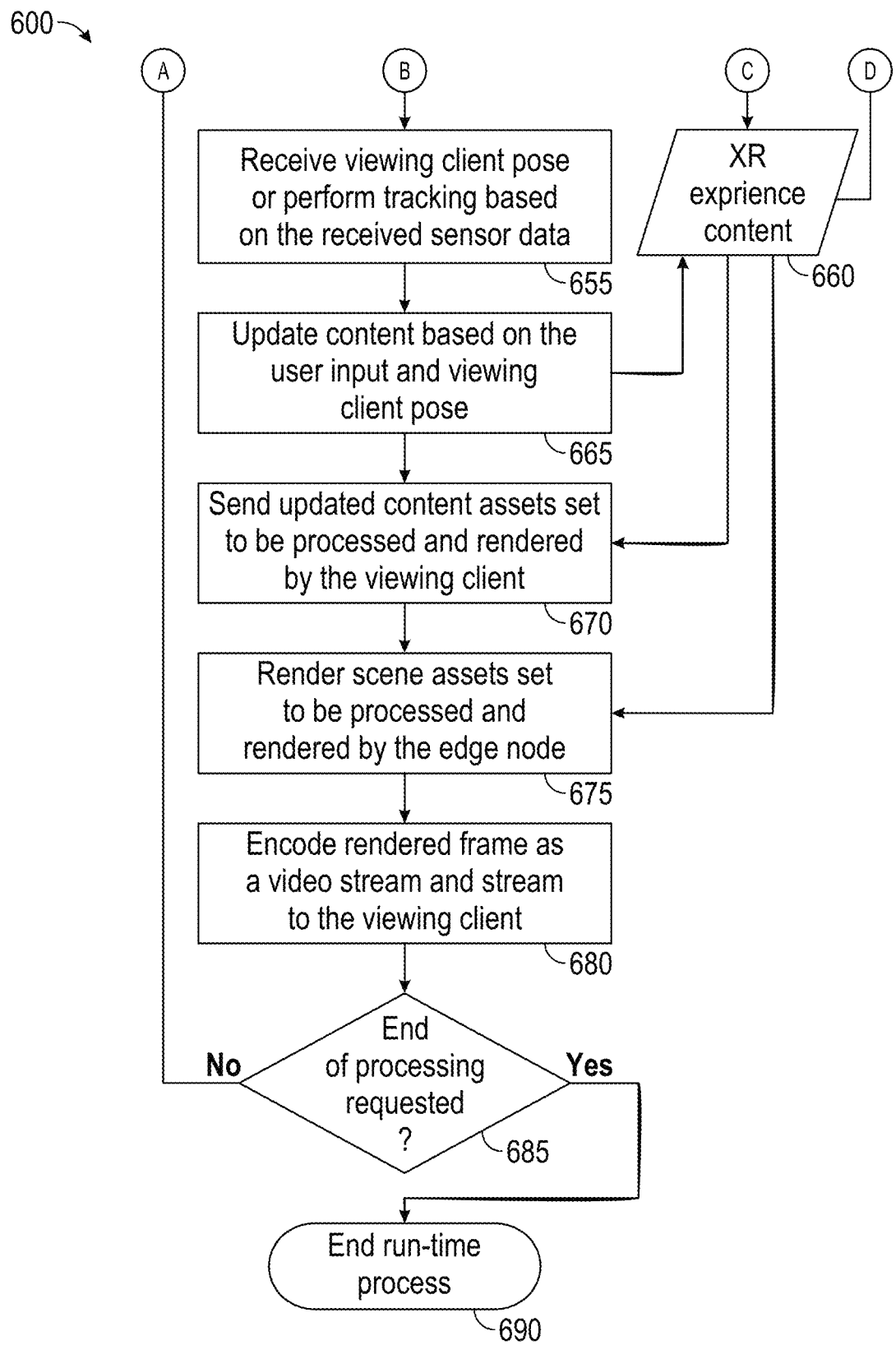

As shown in FIG. 6, a run-time process 600 includes receiving 605 device updates on capabilities and session condition information from the viewing client. The process 600 includes determining 610 whether device capabilities have changed. The process 600 includes, in response to determining that the device capabilities have changed (610="Yes"), performing 615 a session offloading adjustment, and storing session offloading settings in a cache 620. The process 600 includes sending 625 updates to the offloading setting (e.g., stored in the cache 620) to the viewing client. The process 600 includes either in response to determining that the device capabilities have not changed (610="No") or after the sending 625 of the updates to the offloading setting to the viewing client, determining 630 whether session conditions have changed.

The process 600 includes, in response to determining that the session conditions have changed (630="Yes"), performing 640 content adaptation based on content adaptation settings from a cache 645. The performing 640 the content adaptation based on the content adaptation settings includes storing XR experience content in a cache 660. The cache 660 is configured to send XR experience content for the performing 615 of the session offloading adjustment. The process 600 includes either in response to determining that the session conditions have changed (630="Yes") or after the performing 640 the content adaptation based on the content adaptation settings, receiving 650 user input from a user device and sensor data from the viewing client.

The process 600 includes receiving 655 a pose of the user device from the viewing client and performing tracking based on the received sensor data. The process 600 includes updating 665 the XR content based on the user input and the pose. The process 600 includes sending 670 updated content assets for processing and viewing by the viewing client. The process 600 includes rendering 675 scene assets set to be processed and rendered by the edge node. The sending 670 and the rendering 675 include the XR experience content from the cache 660. The process 600 includes encoding 680 a rendered frame as a video stream and streaming the rendered frame to the viewing client. The process 600 includes determining 685 whether an end of processing is requested. The process 600 includes, in response to determining that the end of the processing is not requested (685="No"), returning the process 600 to the receiving step 605. The process 600 includes, in response to determining that the end of the processing is requested (685="Yes"), ending 690 the run-time process 600.

Edge Node Run-Time Processing

Figure 7:
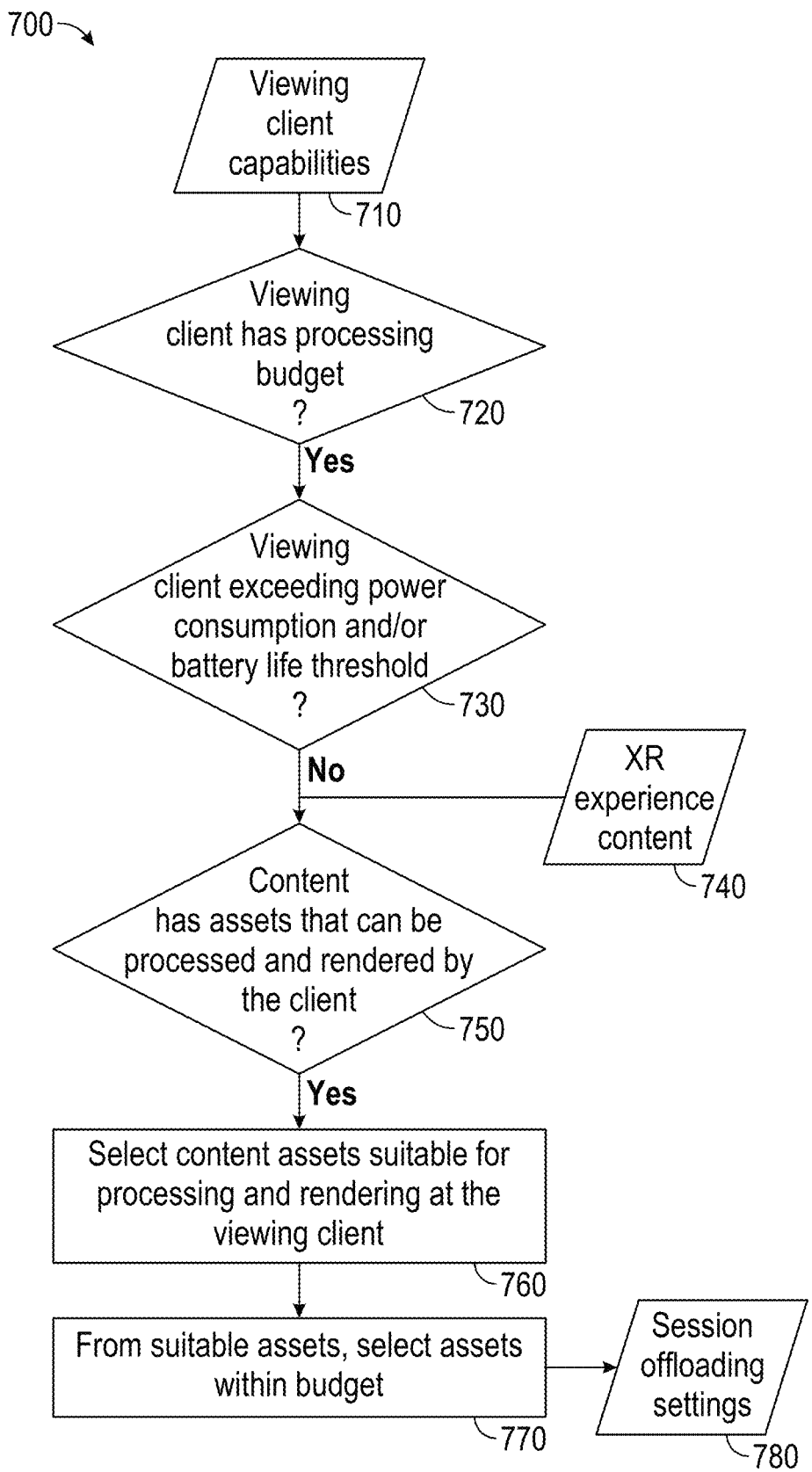
FIG. 7 is a flowchart of a process for adjusting processing offloading, in accordance with some embodiments of the disclosure.
Figure 8:
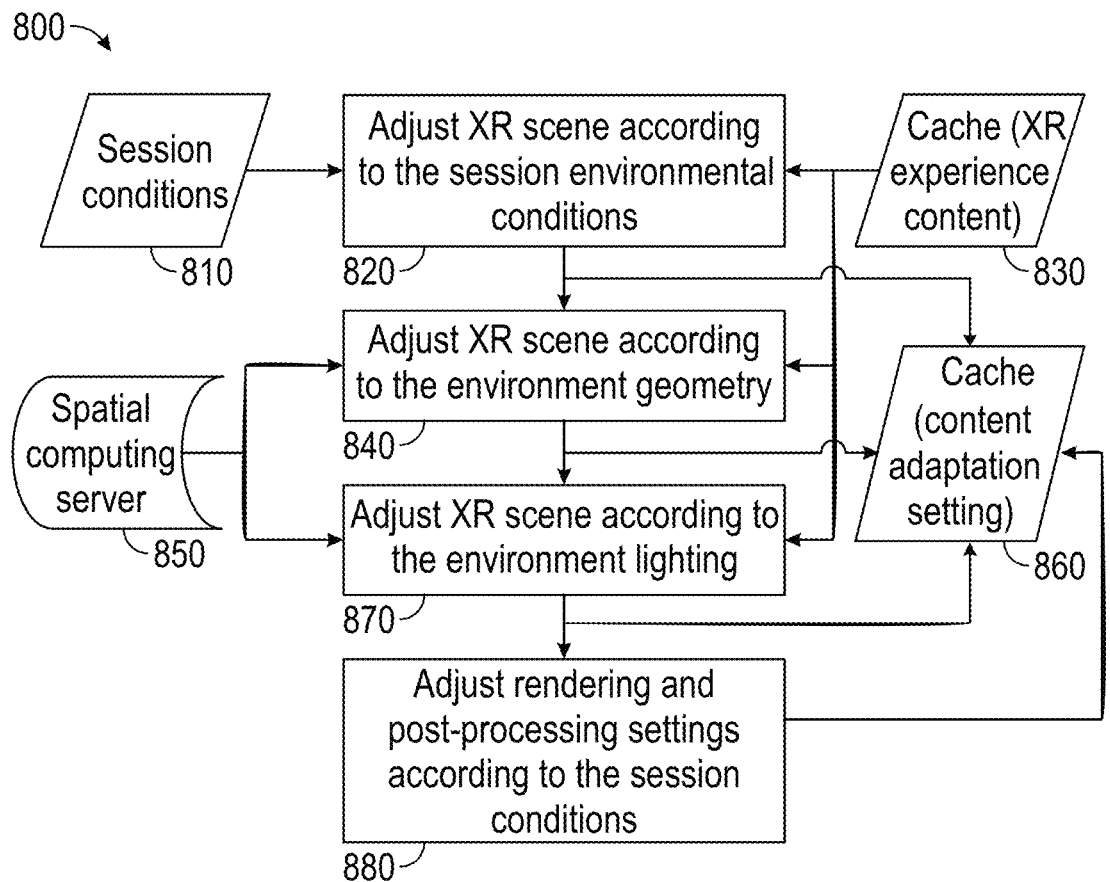
FIG. 8 is a flowchart of a process for content adaptation, in accordance with some embodiments of the disclosure.

In the session run-time processing, the edge node first receives updates on viewing client device capabilities and session conditions. If the device capabilities have changed, a process 700 for adjusting the processing offloading settings is performed. The process 700 for adjusting the processing offloading is illustrated in FIG. 7. Similarly, as a next step in processing, the edge node adjusts the XR content adaptation settings if the session conditions have changed using a dedicated process 800 for performing content adaptation. The content adaptation process 800 is illustrated in FIG. 8.

After processing offloading settings and performing content adaptation, the edge node receives user input and sensor data. In the next step of the processing, the edge node performs device tracking based on the received viewing client sensor data or receives the device pose from the viewing client. When the edge node has the user input and device pose, it updates the XR content using them. The XR content update is carried out by executing the content interaction rules included as part of the XR content.

When the XR content is updated, the edge node sends updated scene assets to the viewing client for the assets that have been defined to be locally processed and rendered by the viewing client. As a last step of the run-time processing, the edge node renders the updated XR content for parts that have been defined to be processed and rendered by the edge node. Rendering output is encoded as a video stream, which is streamed to the viewing client. Depending on whether some elements have been set to be rendered by the XR client, the edge node may render the entire scene or just the subset, which is not going to be rendered by the XR client.

Session Processing Offloading Adjustment

In the session processing offloading adjustment process, the edge node determines which parts of the XR content are processed and rendered by the viewing client and which parts are processed and rendered by the edge node. One goal of the offloading adjustment is to set the viewing client to perform, as much as possible, XR content processing and rendering locally to minimize latency and to reserve edge node capacity to be able to serve as many clients as possible. Additional parameters for adjusting the offloading are provided in some embodiments. For example, power consumption and battery reserve of the XR client, as well as network bandwidth available for streaming, are used as additional factors controlling the offsetting adjustments. The session offloading adjustment is carried out based on the viewing client capabilities, which the viewing client sends to the edge node. The viewing client capabilities describe the processing performance capabilities of the viewing client device and processing performance currently available for the XR session processing. The viewing client capabilities include, for example, a utilization rate of a central processing unit (CPU) and a graphics processing unit (GPU), a memory reservation rate, and any other complex performance indicator used to determine the budget available for XR content processing and rendering at the viewing client side.

If the viewing client has available processing and rendering budgets, the edge node analyzes the XR content to identify content assets that are processed and rendered by the viewing client. Such assets do not interact with other elements of the scene, so the asset is rendered individually and merged with the parts of the scene rendered at the edge node side. If the assets set to be processed and rendered by the viewing client require some additional scene information and elements, such as the scene lighting, the additional scene information and elements are marked to be delivered to the viewing client. Once the edge node has analyzed the scene and identified assets that are processed and rendered locally by the viewing client, the edge node selects the asset that fits the processing and rendering budget available at the viewing client side and updates the session offloading settings accordingly. For mobile devices, approaches are provided to optimize the collaborative rendering and processing of the XR content.

As shown in FIG. 7, the process 700 includes determining 720 whether the viewing client has a processing budget based on analysis of viewing client capabilities stored in a cache 710. The process 700 includes, in response to determining that the viewing client has a sufficient processing budget (720="Yes"), determining 730 whether a power consumption threshold and/or a battery life threshold of the viewing client is exceeded. The determining 730 includes analysis of XR experience content stored in a cache 740. The process 700 includes, in response to determining that the power consumption threshold and/or the battery life threshold of the viewing client is not exceeded (730="No"), determining 750 whether the XR content has assets that are capable of being processed and rendered by the viewing client. The process 700 includes, in response to determining that the XR content has assets that are capable of being processed and rendered by the viewing client (750="Yes"), selecting 760 content assets suitable for processing and rendering at the viewing client. The process 700 includes selecting 770 suitable assets within the processing budget. The process 700 includes storing session offloading settings in a cache 780. The process 700 includes, in response to determining that the viewing client does not have a sufficient processing budget (720="No," not shown), the determining 720 repeats until the viewing client has a sufficient processing budget, or the process 700 ends (not shown). The process 700 includes, in response to determining that the power consumption threshold and/or the battery life threshold of the viewing client is exceeded (730="Yes," not shown), the determining 730 repeats until the power consumption threshold and/or the battery life threshold of the viewing client is not exceeded, or the process 700 ends (not shown). The process 700 includes, in response to determining that the XR content does not have assets that are capable of being processed and rendered by the viewing client (750="No," not shown), the determining 750 repeats until the XR content has assets that are capable of being processed and rendered by the viewing client, or the process 700 ends (not shown).

XR Content Adaptation

FIG. 8 illustrates the process 800 for content adaptation performed by the edge node. A first step of the content adaption is based on the session conditions the viewing client sends to the edge node. The session conditions describe, for example, weather conditions of an outdoor environment detected by the viewing client. A next step in the content adaptation process adjusts the XR content based on the environment data available from the SCS. The adjustment includes, for example, adjusting the XR scene layout to accommodate real, physical environment geometry and/or semantic structure. In addition to the XR scene layout, the scene characteristics, such as a lighting setup, are adjusted to match the real environment lighting. Also, the rendering and post-processing settings are adapted to match the viewing client characteristics, such as camera quality in embodiments utilizing video see-through AR. All adaptation settings are stored by the edge node to the content adaptation settings.

As shown in FIG. 8, the process 800 includes adjusting 820 a scene of the XR content according to session environmental conditions. In some embodiments, the adjusting 820 is based on session conditions stored in a cache 810 and XR experience content stored in a cache 830. In some embodiments, after the adjusting 820, content adaptation settings are stored in a cache 860.

The process 800 includes adjusting 840 the scene of the XR content according to environment geometry. In some embodiments, the adjusting 840 is performed by a SCS 850 and based on the XR experience content stored in the cache 830. In some embodiments, after the adjusting 840, the content adaptation settings are updated in the cache 860.

The process 800 includes adjusting 870 the scene of the XR content according to environment lighting. In some embodiments, the adjusting 870 is performed by the SCS 850 and based on the XR experience content stored in the cache 830. In some embodiments, after the adjusting 870, the content adaptation settings are updated in the cache 860.

The process 800 includes adjusting 880 rendering and post-processing settings according to the adjusted scene of the XR content. In some embodiments, after the adjusting 880, the content adaptation settings are updated in the cache 860.

Session Handover

Mobile XR experiences are provided in some embodiments. With mobile XR experiences, a seamless session handover from one edge node to another is desirable in order to improve a quality of experience for users on the move. The session handover is performed in some embodiments with a make-before-break (MBB) approach. In the MBB approach, the viewing client establishes a connection with the XR processing service on the edge node that has newly become available while also maintaining the older connection in an ongoing session with the previously connected edge node. The newly connected edge node creates and initializes an XR session with identical settings before the connection is handed over.

In some embodiments, the client has multiple concurrent connections. For each connection, an XR session with identical session offloading and content adaptation is provided. Each XR session also includes identical XR content scene states. In order to set up sessions with predetermined content adaptation and session offloading settings, an external data switch service is used in some embodiments. The data switch is part of the content server, or the data switch is an additional external service, which is accessible by all the edge nodes. The data switch service manages the XR content scene state transfer as part of the session settings. The scene state is transferred directly from node to node in some embodiments. The scene state is transferred via content server in other embodiments. A sequence of communication between entities for handing over the session from one node to another is provided. The XR scene state is contained in the session settings. The XR scene state contains all state information that has impact on the behavior or outlook of the XR scene. The XR scene state includes all XR content elements in motion, for example, non-playing characters simulated by the software and random number seeds used for content initialization and processing.

A sequence of communication is provided for embodiments where the XR scene is requested from the content server by the XR application executed on the edge node. In other embodiments, the content is a standalone executable, and the new edge node loads the standalone executable from either a locally cached copy, or via a high bandwidth link from the content server. In embodiments where the new edge loads the executable via the high bandwidth link from the content server, the MBB operation requires a relatively longer duration of time to complete compared to the executable loaded from the locally cached copy.

In the session handover, the viewing client connects to the XR processing service on the edge node. The edge node becomes available as the user moves to a vicinity of a new edge node. When the viewing client discovers an XR processing service on the new edge node, the viewing client signals the XR processing service. The XR processing service executes an active session to upload the session offloading settings and adaptation settings to the switch service. The XR processing service maintains the state of the settings uploaded to the switch service until the session handover is finalized. When the edge node uploads the settings to the switch service, the edge node receives a session identifier, which is used to point out settings uploaded to the switch service specific for the current session.

When the viewing client has signaled the edge node currently executing the XR session to upload the settings, the viewing client receives a session identifier from the edge node, which points out the session settings on the switch service. The viewing client forwards the session identifier to the XR processing service on the edge node that has become available. The XR processing service utilizes the session identifier to download the session settings from the switch service and then initializes a new XR session using the settings. In the case of the standalone executable, the intermediate state of processing and rendering XR content is recorded by the client device and shared with the edge nodes, which provides an option to reduce computation in the case that the new node has to start with initial random and/or pseudorandom number seeds. Sharing the intermediate state helps the new node reproduce the desired effect at the handover even if the new node does not have all the information of the past adaptation that the old node processed and rendered.

Once the new session is set up, the XR processing service on the new edge node signals the viewing client that the handover is performed. The viewing client signals the handover to the XR processing service previously executing the session so that the previous session is shut down. The viewing client switches from the old node to the new node using data received from the edge node with the new connection.

In some embodiments, the viewing client executed on the client device sends a camera image feed captured from an on-device camera to the edge node for the edge node to perform visual odometry. Visual odometry is camera tracking used to determine a position and an orientation of the camera so that virtual content is augmented correctly to match a real-world scene observed by a user and/or to match a head motion of the user in embodiments where the client device is a head-mounted display (HMD). With embodiments using the HMD, visual odometry is a computer vision task executed by the edge node using the sensor data received from the viewing client.

In some embodiments, an XR processing task includes any type of compute intensive task performed by the edge node in service of the client. For example, the XR processing task includes at least one of computer vision, identification of objects, machine learning, reading text, character recognition, combinations of the same, or the like. Such tasks are performed in an XR environment as a subtask in some embodiments. The XR processing task is executed by the edge node, and specific sensor data analysis is provided instead of a combination of visual odometry and XR viewing environmental condition inference in some embodiments. For example, a computer vision task is executed on the edge node for identifying signage on a road from the visual data captured from autonomous driving vehicle cameras. The computation assets of, or connected to, the vehicle moving on the road are configured to perform a communication handover when moving from the vicinity of one radio frequency (RF) base station and/or access point to another. Also, in some embodiments, in response to the communication handover, a processing node handover occurs due to a low latency requirement. The low latency requirement results, for example, from a need to continuously execute one or more processing functions, e.g., signage identification while the vehicle is in motion, and the like. In some embodiments, the processing handed over between edge nodes requires session-specific information for specific computer vision or machine learning-based sensor data analysis. The computing required for the handover applies to these various use cases. To account for such variations, it is noted that descriptions of FIG. 10, such as the "Update content and render output" steps (e.g., 1072, 1084, and the like) of the process 1000 are understood to include receiving inference(s) in embodiments requiring such functionality. Also, the "User input and sensor data" steps (e.g., 1018, 1066, 1069, and the like) are considered to include video and sensor data flowing upstream in embodiments requiring such functionality. The content adaptation rules include video pre-processing to account for varying and/or low light conditions, and the like, in some embodiments.

Figure 10:
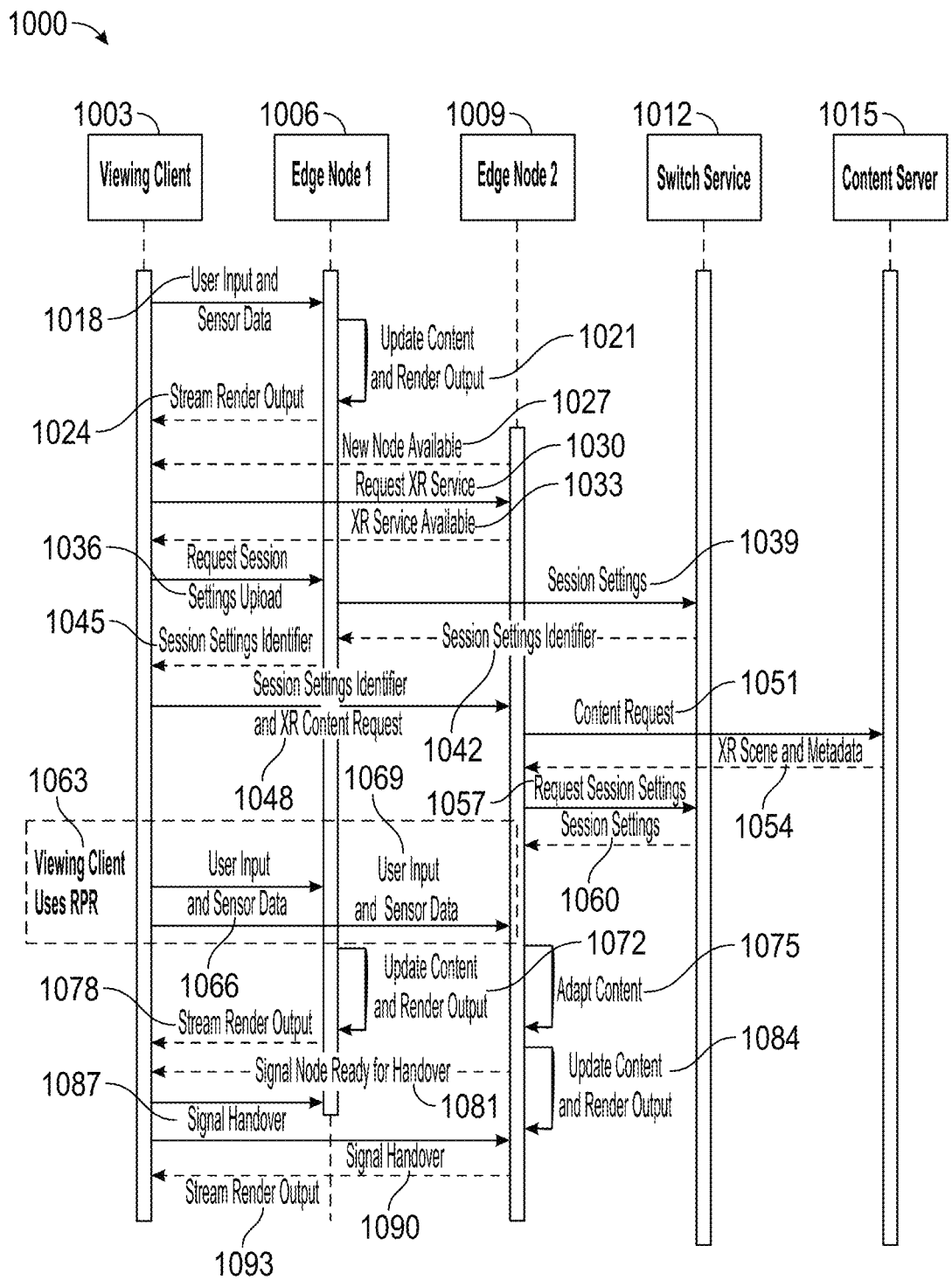
FIG. 10 depicts a state diagram including a viewing client, a first edge node, a second edge node, a switch service, and a content server, in accordance with some embodiments of the disclosure.

A smooth handover is provided. In some embodiments, the smooth handover is performed by and/or on top of a well-performing mobility management in edge computing. The smooth handover provided herein improves overall performance, quality, and user experiences for mobile-based users and applications, particularly in the XR environment. The use of high frequencies for larger bandwidths, smaller cells, and heterogeneous networks for increased user capacity and constant data demands require high-performance handover management. While improvements at the networking level are desirable, the present methods and systems improve handover at the application level in some embodiments. At the application level, visual content is encoded, optimized, and transmitted. Considering a handover across two edge nodes, the viewing client is configured to encode and deliver essential visual data for the new edge node to start processing with content adaptation. In order to minimize latency, a stream of a first independently decodable picture is provided, as quickly as possible, to the new edge node. In video compression, a first independently decodable picture usually requires a higher bitrate. However, in some embodiments, a reference picture resampling (RPR) option in versatile video coding (VVC) is provided to reduce the data rate in delivering the first picture. The handover diagram in FIG. 10 depicts an appropriate signaling or triggering that is applicable to the use of RPR in video compression. The second instantaneous decoder refresh (IDR) in the picture sequence is inserted to ensure that the second edge node is able to initiate proper decoding with a minimum latency. The use of RPR avoids a burst of bitrate when the client encodes and sends data to the first edge node. In some implementations, with the second edge node joining, the client device is required to send data to both nodes at the same time, where it is desirable to reduce the required bandwidth.

Figure 9:
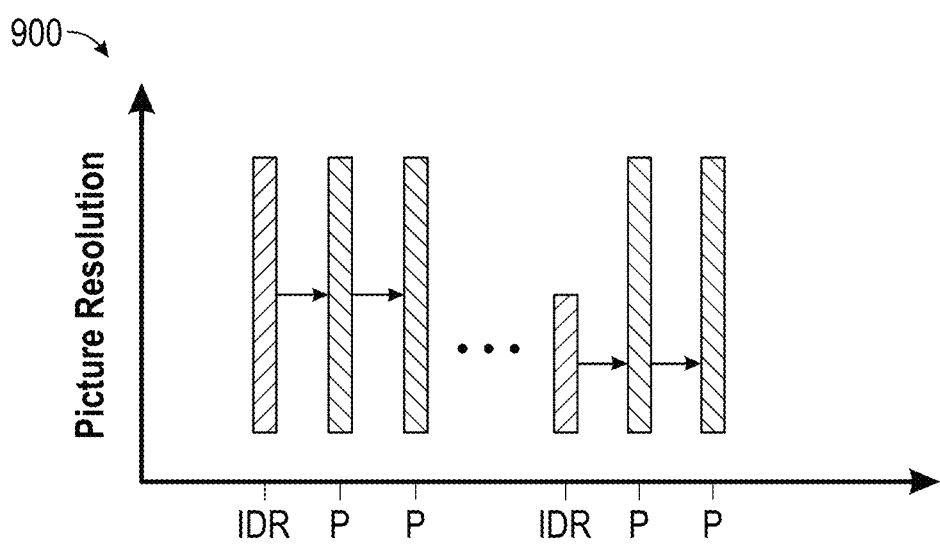
FIG. 9 depicts a chart of picture resolution over time, in accordance with some embodiments of the disclosure.

The triggering of RPR in video compression is beneficial for duplicated transmission and reception in handover. For the 3rd Generation Partnership Project (3GPP), for example, RPR shortens mobility interruption time. In this example, both the old and new edge nodes have a simultaneous reception of user data to ensure a seamless transition. RPR results in improved bitrate management. RPR also delivers a "less spiky" bitrate at encoding and sending of the reference picture, which helps the client deliver the reference picture to both edge nodes. As a result, the edge nodes receive and process data with minimized latency. FIG. 9 illustrates this approach. As shown in FIG. 9, a reduction of picture resolution at the second IDR leads to a reduced bitrate for transmitting the IDR from the client to both edge nodes. The following P pictures are encoded at the original resolution, if desired, without a need for inserting an IDR encoded at the original resolution.

As shown in FIG. 10, a session handover process 1000 includes processing and communications between, for example, a viewing client 1003, a first edge node 1006, a second edge node 1009, a switch service 1012, and a content server 1015. The process 1000 includes transmitting 1018, from the viewing client 1003, user input and sensor data to the first edge node 1006. The process 1000 includes updating 1021, at the first edge node 1006, the XR content and rendering, at the first edge node 1006, output based on the XR content. The process 1000 includes streaming 1024, from the first edge node 1006, the rendered output to the viewing client 1003. The process 1000 includes advertising 1027, from the second edge node 1009, availability of a new node.

The process 1000 includes, in response to the change in the condition of the viewing client 1003, transmitting 1030, from the viewing client 1003, a request for the new node to the second edge node 1009. The process 1000 includes, in response to receiving the request for the new node, advertising 1033, at the second edge node 1009, whether XR service is available. The process 1000 includes, in response to determining that the XR service is available at the second edge node 1009 (1033="Yes"), advertising 1033 availability of the XR service to the viewing client 1003. The process 1000 includes, in response to receiving, at the viewing client 1003, availability of the XR service, requesting 1036 an upload of session settings from the first edge node 1006. The process 1000 includes, in response to receiving the request for the upload of the session settings, transmitting 1039, from the first edge node 1006, the session settings to a switch service 1012. The process 1000 includes, in response to receiving, at the switch service 1012, the session settings, transmitting 1042, from the switch service 1012, a session settings identifier, to the first edge node 1006. The process 1000 includes transmitting 1045 the session settings identifier from the first edge node 1006 to the viewing client 1003. The process 1000 includes transmitting 1048, from the viewing client 1003, the session settings identifier and an XR content request to the second edge node 1009. The process 1000 includes transmitting 1051 a content request from the second edge node 1009 to a content server 1015. The process 1000 includes transmitting 1054 an XR scene and metadata from the content server 1015 to the second edge node 1009. The process 1000 includes requesting 1057, at the second edge node 1009, session settings from the switch service 1012. The process 1000 includes transmitting 1060 the session settings from the switch service 1012 to the second edge node 1009.

The process 1000 includes, utilizing the RPR 1063, transmitting 1066 the user input and the sensor data from the viewing client 1003 to the first edge node 1006. The process 1000 includes, in response to receiving the user input and the sensor data from the viewing client 1003: updating 1072, at the first edge node 1006, the XR content, and rendering, at the first edge node 1006, the output; and streaming 1078 the output from the first edge node 1006 to the viewing client 1003.

The process 1000 includes, utilizing the RPR 1063, transmitting 1069 the user input and the sensor data from the viewing client 1003 to the second edge node 1009. The process 1000 includes, in response to receiving the user input and the sensor data from the viewing client 1003, adapting 1075, at the second edge node 1009, the XR content; updating 1084, at the second edge node 1009, the XR content, and rendering, at the second edge node 1009, the output; and transmitting 1081 a signal that the second edge node 1009 is ready for handover from the second edge node 1009 to the viewing client 1003.

The process 1000 includes, in response to receiving the signal that the second edge node 1009 is ready for handover, transmitting 1087, from the viewing client 1003, a signal handover to the first edge node 1006; transmitting 1090, from the viewing client 1003, a signal handover to the second edge node 1009; and streaming 1093 the output from the second edge node 1009 to the viewing client 1003.

Viewing Client

Figure 11:
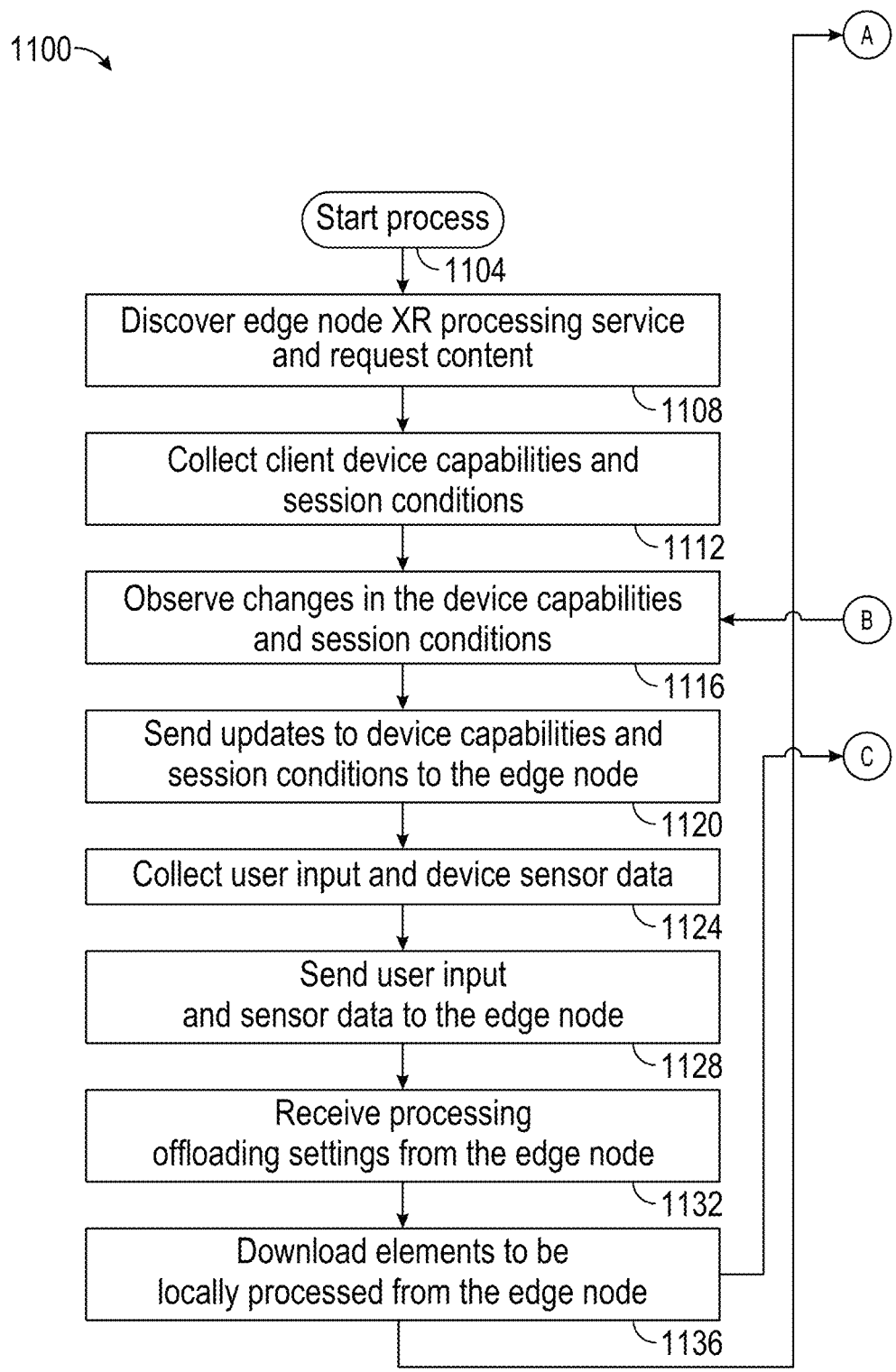
FIG. 11 is a flowchart of a process for a viewing client, in accordance with some embodiments of the disclosure.
Figure 11:
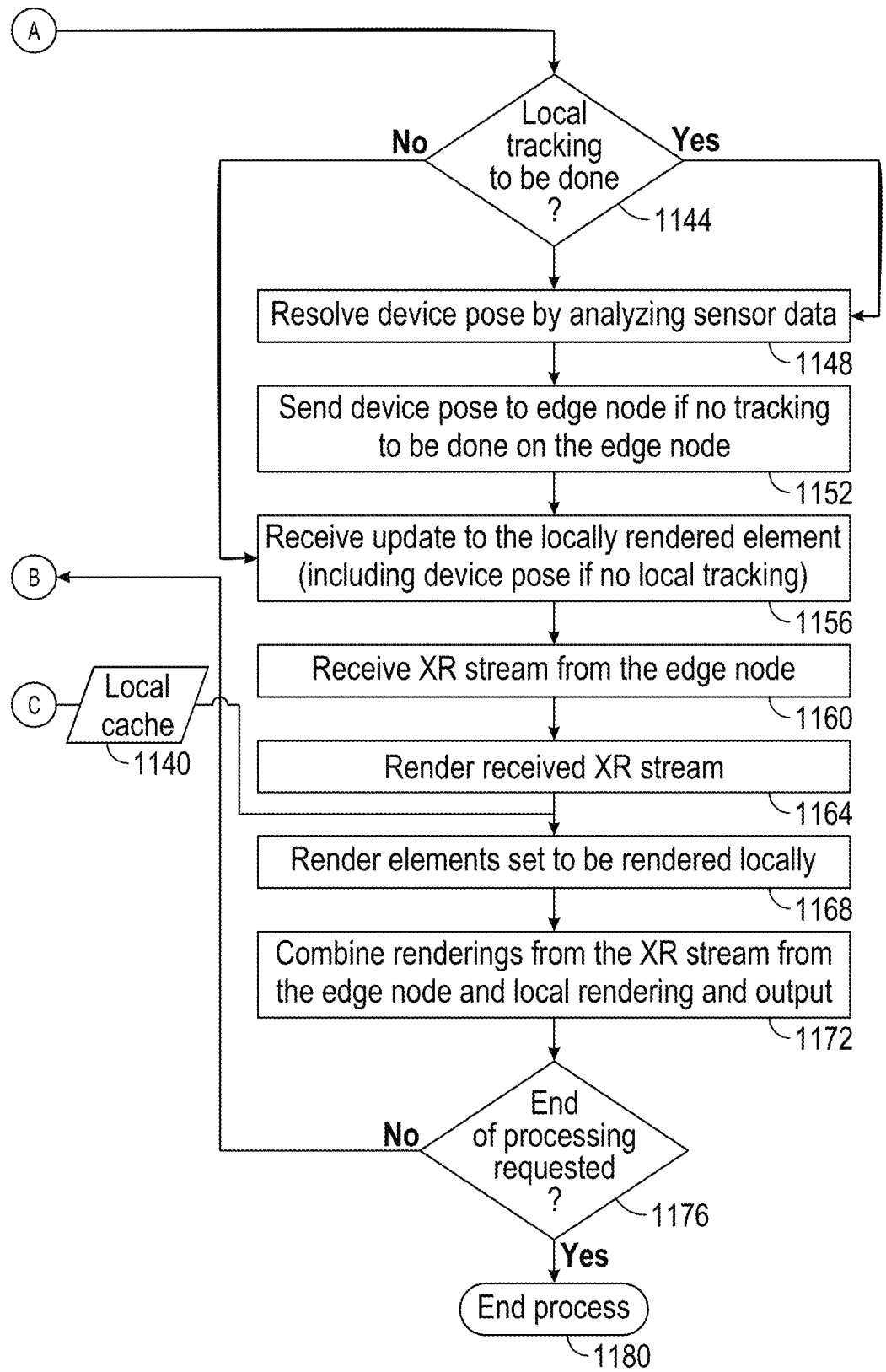

FIG. 11 illustrates a process 1100 executed by the viewing client. The process executed by the viewing client starts when a user launches the application implementing the viewing client. When a user starts the application, the user defines the content to be viewed or requests content based on the user location. The content is accessible via a link to a download package or a scene description residing on the content server. A viewing client application is launched either by explicit command by the user or automatically by the operating system based on identifying a content type request and an application associated with the specific content type. The viewing client is provided as a standalone application in some embodiments. The viewing client is integrated with a web browser or a social media client in other embodiments. The viewing client is part of the operating system in still other embodiments.

When the viewing client process starts, the viewing client discovers the XR processing service from the edge node. As the service is being discovered, the viewing client also communicates the content request with the content identification or using global anchoring to the edge node. When the XR service discovery and content request have been carried out, the viewing client proceeds to collect device capabilities and session conditions that impact the XR session execution and content adaptation.

Once the initial device capability and session condition collection is complete, the viewing client proceeds to perform a run-time processing loop, which is performed continuously while the XR content is being consumed.

At the beginning of each run-time loop iteration, the viewing client first observes the device capabilities and session conditions and compares the current values with the previous values in order to detect changes in the device capabilities and session conditions. Changes in the device capabilities and session conditions are transmitted to the XR service on the edge node, so that the XR content is adapted to the updated conditions.

A next step in the processing executed by the viewing client is the collection of user input and device sensor data that drive the interaction with the XR content. The processing required to update the XR scene based on the user input and device sensor data is performed on the edge node. After sending the input and sensor data, the viewing client receives a processing offloading setting from the edge node. The offloading setting determines one or more parts of the XR scene for updates and local rendering by the viewing client. The distribution of the XR scene processing and rendering is determined by the edge node based on the viewing client capabilities.

If the processing of the offloading settings received from the edge node determines that the viewing client needs to perform processing and rendering of the specific parts of the XR scene, the viewing client next proceeds to download the asset data from the edge node for the one or more parts of the XR scene for updates and local rendering by the viewing client. Downloaded assets are stored by the viewing client in the local cache.

The XR scene needs to be rendered to match the dynamically changing viewpoint that matches the HMD, or the mobile device pose. Device tracking is required for solving the pose of the device. When XR processing is offloaded at least partially to the edge node, depending on the XR content and offloading settings, the viewing client and/or the edge node may perform the tracking processing (e.g., visual odometry), which resolves the device pose from the collected sensor data. If the device tracking needs to be performed by the viewing client, the viewing client analyzes the sensor data collected from the device sensors in order to infer the current device pose. If the tracking is performed on the edge node, the viewing client receives the device pose and updates the locally processed content elements. If there are non-locally processed and rendered scene assets on the viewing client side, then the device poses and the asset updates do not need to be received by the viewing client.

In the last steps of the viewing client processing, the viewing client receives the XR content rendered and streamed as a video stream from the edge node. The received XR video stream is rendered to the output buffer. If the viewing client is processing and rendering some scene assets locally, then the viewing client updates the assets and renders them. The resulting frame data from the local rendering is combined with the XR scene rendered by the edge node into an output buffer. The output buffer data is sent to one or more device displays.

If end of processing is not signaled (e.g., by user, application, edge node or operating system), then the processing continues to go back to the beginning of the run-time processing loop.

As shown in FIG. 11, the process 1100 executed by the viewing client includes starting 1104 the process 1100. The process 1100 includes, at the viewing client, discovering 1108 availability of an edge node XR processing service at the first edge node or the second edge node and requesting the XR content from the first edge node or the second edge node. The process 1100 includes collecting 1112 client device capabilities and session conditions. The process 1100 includes observing 1116 changes in the client device capabilities and the session conditions. The process 1100 includes sending 1120 updates of the client device capabilities and the session conditions to the first edge node or the second edge node. The process 1100 includes collecting 1124 user input and sensor data. The process 1100 includes sending 1128 the user input and the sensor data to the first edge node or the second edge node. The process 1100 includes receiving 1132 processing offloading settings from the first edge node or the second edge node. The process 1100 includes downloading 1136 elements for local processing from the first edge node or the second edge node to a local cache 1140.

The process 1100 includes determining 1144 whether local tracking can be performed. The process 1100 includes, in response to determining that the local tracking can be performed (1144="Yes"), resolving 1148 a pose of the device by analyzing the sensor data and sending 1152 the pose of the device to the first edge node or the second edge node. The process 1100 includes, after the sending 1152 or in response to determining that the local tracking cannot be performed (1144="No"), receiving 1156 an update to a locally rendered element (including device pose if there is no local tracking). The process 1100 includes receiving 1160 an XR stream from the first edge node or the second edge node. The process 1100 includes rendering 1164 the received XR stream. The process 1100 includes rendering 1168 elements set to be rendered locally from the local cache 1140. The process 1100 includes combining 1172 renderings from the XR stream from the first edge node or the second edge node and the local rendering and outputting the combined renderings. The process 1100 includes determining 1176 whether an end of processing is requested. In response to the determining 1176 that the end of processing is not requested (1176="No"), the process 1100 reverts to the observing 1116 step. The process 1100 includes, in response to the determining 1176 that the end of processing is requested (1176="Yes"), ending 1180 the process 1100.

Predictive Model

Figure 12:
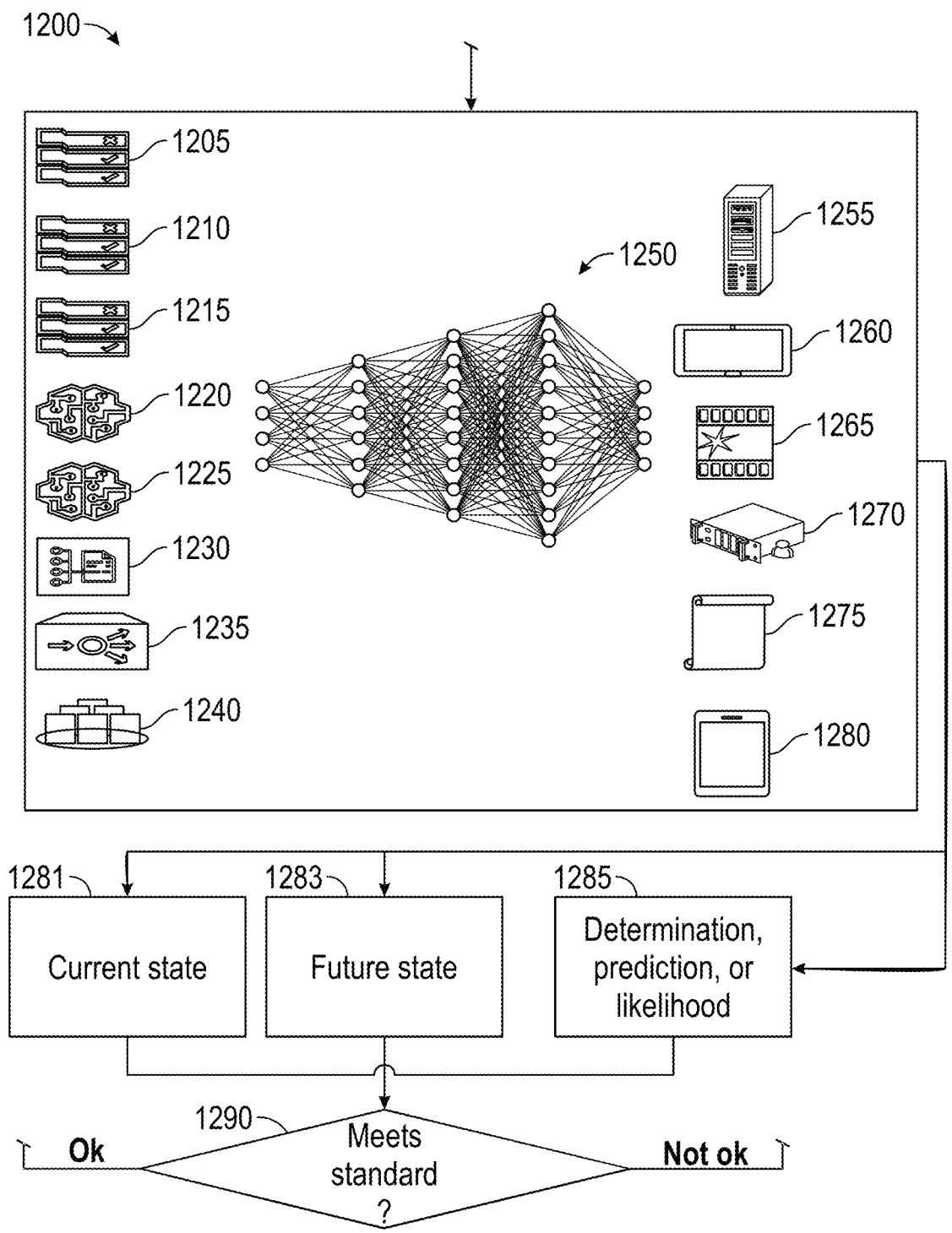
FIG. 12 depicts an artificial intelligence system, in accordance with some embodiments of the disclosure.

Throughout the present disclosure, determinations, predictions, likelihoods, and the like are determined with one or more predictive models. For example, FIG. 12 depicts a predictive model. A prediction process 1200 includes a predictive model 1250 in some embodiments. The predictive model 1250 receives as input various forms of data about one, more or all the users, media content items, devices, and data described in the present disclosure. The predictive model 1250 performs analysis based on at least one of hard rules, learning rules, hard models, learning models, usage data, load data, analytics of the same, metadata, or profile information, and the like. The predictive model 1250 outputs one or more predictions of a future state of any of the devices described in the present disclosure. A load-increasing event is determined by load-balancing techniques, e.g., least connection, least bandwidth, round robin, server response time, weighted versions of the same, resource-based techniques, and address hashing. The predictive model 1250 is based on input including at least one of a hard rule 1205, a user-defined rule 1210, a rule defined by a content provider 1215, a hard model 1220, or a learning model 1225.

The predictive model 1250 receives as input usage data 1230. The predictive model 1250 is based, in some embodiments, on at least one of a usage pattern of the user or media device, a usage pattern of the requesting media device, a usage pattern of the media content item, a usage pattern of the communication system or network, a usage pattern of the profile, or a usage pattern of the media device.

The predictive model 1250 receives as input load-balancing data 1235. The predictive model 1250 is based on at least one of load data of the display device, load data of the requesting media device, load data of the media content item, load data of the communication system or network, load data of the profile, or load data of the media device.

The predictive model 1250 receives as input metadata 1240. The predictive model 1250 is based on at least one of metadata of the streaming service, metadata of the requesting media device, metadata of the media content item, metadata of the communication system or network, metadata of the profile, or metadata of the media device. The metadata includes information of the type represented in the media device manifest.

The predictive model 1250 is trained with data. The training data is developed in some embodiments using one or more data techniques including but not limited to data selection, data sourcing, and data synthesis. The predictive model 1250 is trained in some embodiments with one or more analytical techniques including but not limited to classification and regression trees (CART), discrete choice models, linear regression models, logistic regression, logit versus probit, multinomial logistic regression, multivariate adaptive regression splines, probit regression, regression techniques, survival or duration analysis, and time series models. The predictive model 1250 is trained in some embodiments with one or more machine learning approaches including but not limited to supervised learning, unsupervised learning, semi-supervised learning, reinforcement learning, and dimensionality reduction. The predictive model 1250 in some embodiments includes regression analysis including analysis of variance (ANOVA), linear regression, logistic regression, ridge regression, and/or time series. The predictive model 1250 in some embodiments includes classification analysis including decision trees and/or neural networks. In FIG. 12, a depiction of a multi-layer neural network is provided as a non-limiting example of a predictive model 1250, the neural network including an input layer (left side), three hidden layers (middle), and an output layer (right side) with 32 neurons and 192 edges, which is intended to be illustrative, not limiting. The predictive model 1250 is based on data engineering and/or modeling techniques. The data engineering techniques include exploration, cleaning, normalizing, feature engineering, and scaling. The modeling techniques include model selection, training, evaluation, and tuning. The predictive model 1250 is operationalized using registration, deployment, monitoring, and/or retraining techniques.

The predictive model 1240 is configured to output results to a device or multiple devices. The device includes means for performing one, more, or all the features referenced herein of the methods, processes, and outputs of one or more of FIGS. 1-11, inclusive, in any suitable combination. The device is at least one of a server 1255, a tablet 1260, a media display device 1265, a network-connected computer 1270, a media device 1275, a computing device 1280, or the like.

The predictive model 1250 is configured to output a current state 1281, and/or a future state 1283, and/or a determination, a prediction, or a likelihood 1285, and the like. The current state 1281, and/or the future state 1283, and/or the determination, the prediction, or the likelihood 1285, and the like may be compared 1290 to a predetermined or determined standard. In some embodiments, the standard is satisfied (1290=OK) or rejected (1290=NOT OK). If the standard is satisfied or rejected, the predictive process 1200 outputs at least one of the current state, the future state, the determination, the prediction, or the likelihood to any device or module disclosed herein.

Communication System

Figure 13:
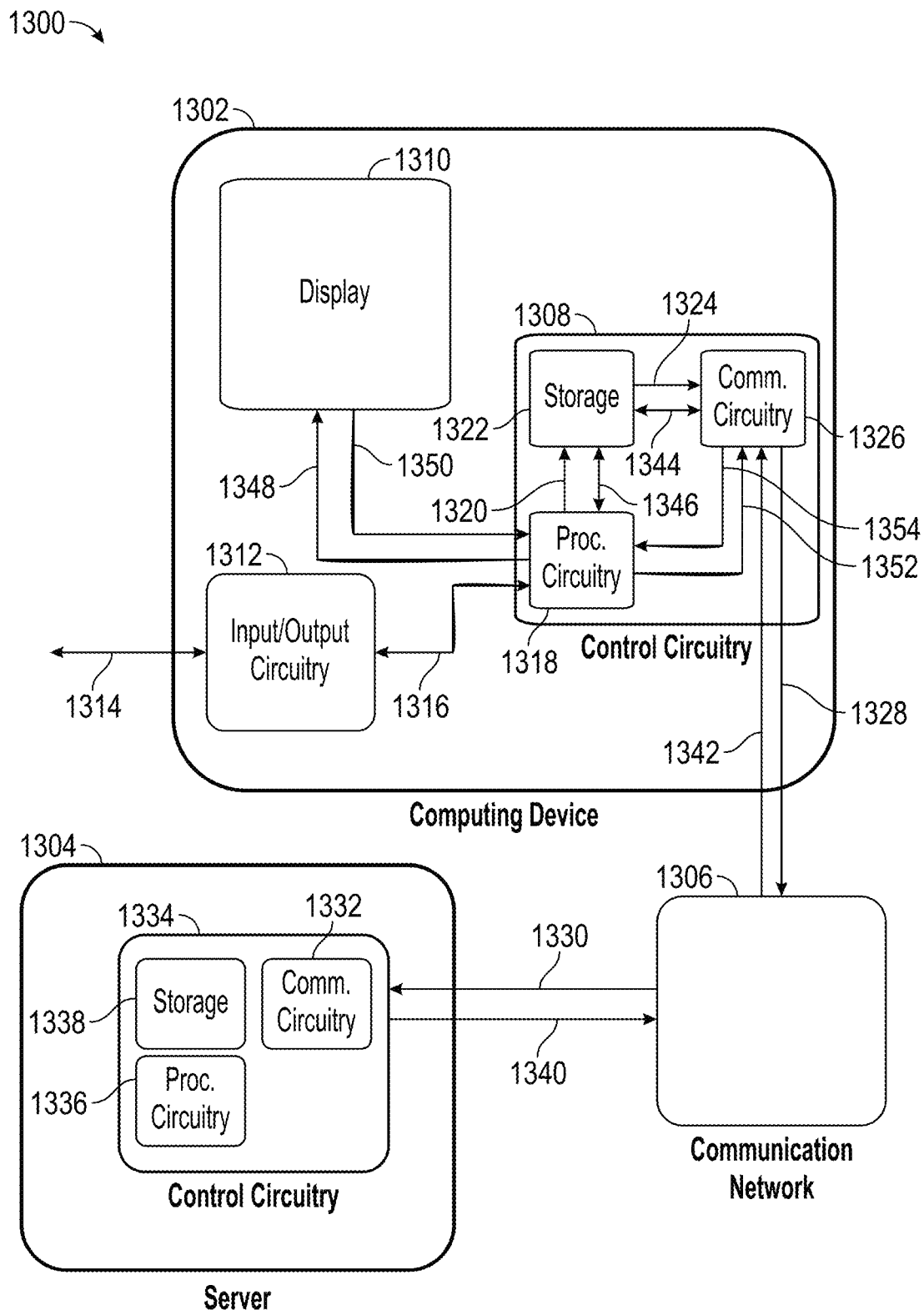
FIG. 13 depicts a system including a server, a communication network, and a computing device for performing the methods and processes noted herein, in accordance with some embodiments of the disclosure.

FIG. 13 depicts a block diagram of system 1300, in accordance with some embodiments. The system is shown to include computing device 1302, server 1304, and a communication network 1306. It is understood that while a single instance of a component may be shown and described relative to FIG. 13, additional embodiments of the component may be employed. For example, server 1304 may include, or may be incorporated in, more than one server. Similarly, communication network 1306 may include, or may be incorporated in, more than one communication network. Server 1304 is shown communicatively coupled to computing device 1302 through communication network 1306. While not shown in FIG. 13, server 1304 may be directly communicatively coupled to computing device 1302, for example, in a system absent or bypassing communication network 1306.

Communication network 1306 may include one or more network systems, such as, without limitation, the Internet, LAN, Wi-Fi, wireless, or other network systems suitable for audio processing applications. The system 1300 of FIG. 13 excludes server 1304, and functionality that would otherwise be implemented by server 1304 is instead implemented by other components of the system depicted by FIG. 13, such as one or more components of communication network 1306. In still other embodiments, server 1304 works in conjunction with one or more components of communication network 1306 to implement certain functionality described herein in a distributed or cooperative manner. Similarly, the system depicted by FIG. 13 excludes computing device 1302, and functionality that would otherwise be implemented by computing device 1302 is instead implemented by other components of the system depicted by FIG. 13, such as one or more components of communication network 1306 or server 1304 or a combination of the same. In other embodiments, computing device 1302 works in conjunction with one or more components of communication network 1306 or server 1304 to implement certain functionality described herein in a distributed or cooperative manner.

Computing device 1302 includes control circuitry 1308, display 1310 and input/output (I/O) circuitry 1312. Control circuitry 1308 may be based on any suitable processing circuitry and includes control circuits and memory circuits, which may be disposed on a single integrated circuit or may be discrete components. As referred to herein, processing circuitry should be understood to mean circuitry based on at least one of microprocessors, microcontrollers, digital signal processors, programmable logic devices, field-programmable gate arrays (FPGAs), or application-specific integrated circuits (ASICs), and the like, and may include a multi-core processor (e.g., dual-core, quad-core, hexa-core, or any suitable number of cores). In some embodiments, processing circuitry may be distributed across multiple separate processors or processing units, for example, multiple of the same type of processing units (e.g., two Intel Core i7 processors) or multiple different processors (e.g., an Intel Core i5 processor and an Intel Core i7 processor). Some control circuits may be implemented in hardware, firmware, or software. Control circuitry 1308 in turn includes communication circuitry 1326, storage 1322 and processing circuitry 1318. Either of control circuitry 1308 and 1334 may be utilized to execute or perform any or all the methods, processes, and outputs of one or more of FIGS. 1-11, or any combination of steps thereof (e.g., as enabled by processing circuitries 1318 and 1336, respectively).

In addition to control circuitry 1308 and 1334, computing device 1302 and server 1304 may each include storage (storage 1322, and storage 1338, respectively). Each of storages 1322 and 1338 may be an electronic storage device. As referred to herein, the phrase "electronic storage device" or "storage device" should be understood to mean any device for storing electronic data, computer software, or firmware, such as random-access memory, read-only memory, hard drives, optical drives, digital video disc (DVD) recorders, compact disc (CD) recorders, BLU-RAY disc (BD) recorders, BLU-RAY 8D disc recorders, digital video recorders (DVRs, sometimes called personal video recorders, or PVRs), solid state devices, quantum storage devices, gaming consoles, gaming media, or any other suitable fixed or removable storage devices, and/or any combination of the same. Each of storage 1322 and 1338 may be used to store several types of content, metadata, and/or other types of data. Non-volatile memory may also be used (e.g., to launch a boot-up routine and other instructions). Cloud-based storage may be used to supplement storages 1322 and 1338 or instead of storages 1322 and 1338. In some embodiments, a user profile and messages corresponding to a chain of communication may be stored in one or more of storages 1322 and 1338. Each of storages 1322 and 1338 may be utilized to store commands, for example, such that when each of processing circuitries 1318 and 1336, respectively, are prompted through control circuitries 1308 and 1334, respectively. Either of processing circuitries 1318 or 1336 may execute any of the methods, processes, and outputs of one or more of FIGS. 1-11, or any combination of steps thereof.

In some embodiments, control circuitry 1308 and/or 1334 executes instructions for an application stored in memory (e.g., storage 1322 and/or storage 1338). Specifically, control circuitry 1308 and/or 1334 may be instructed by the application to perform the functions discussed herein. In some embodiments, any action performed by control circuitry 1308 and/or 1334 may be based on instructions received from the application. For example, the application may be implemented as software or a set of and/or one or more executable instructions that may be stored in storage 1322 and/or 1338 and executed by control circuitry 1308 and/or 1334. The application may be a client/server application where only a client application resides on computing device 1302, and a server application resides on server 1304.

The application may be implemented using any suitable architecture. For example, it may be a stand-alone application wholly implemented on computing device 1302. In such an approach, instructions for the application are stored locally (e.g., in storage 1322), and data for use by the application is downloaded on a periodic basis (e.g., from an out-of-band feed, from an Internet resource, or using another suitable approach). Control circuitry 1308 may retrieve instructions for the application from storage 1322 and process the instructions to perform the functionality described herein. Based on the processed instructions, control circuitry 1308 may determine a type of action to perform in response to input received from I/O circuitry 1312 or from communication network 1306.

In client/server-based embodiments, control circuitry 1308 may include communication circuitry suitable for communicating with an application server (e.g., server 1304) or other networks or servers. The instructions for carrying out the functionality described herein may be stored on the application server. Communication circuitry may include a cable modem, an Ethernet card, or a wireless modem for communication with other equipment, or any other suitable communication circuitry. Such communication may involve the Internet or any other suitable communication networks or paths (e.g., communication network 1306). In another example of a client/server-based application, control circuitry 1308 runs a web browser that interprets web pages provided by a remote server (e.g., server 1304). For example, the remote server may store the instructions for the application in a storage device.

The remote server may process the stored instructions using circuitry (e.g., control circuitry 1334) and/or generate displays. Computing device 1302 may receive the displays generated by the remote server and may display the content of the displays locally via display 1310. For example, display 1310 may be utilized to present a string of characters. This way, the processing of the instructions is performed remotely (e.g., by server 1304) while the resulting displays, such as the display windows described elsewhere herein, are provided locally on computing device 1304. Computing device 1302 may receive inputs from the user via input/output circuitry 1312 and transmit those inputs to the remote server for processing and generating the corresponding displays.

Alternatively, computing device 1302 may receive inputs from the user via input/output circuitry 1312 and process and display the received inputs locally, by control circuitry 1308 and display 1310, respectively. For example, input/output circuitry 1312 may correspond to a keyboard and/or a set of and/or one or more speakers/microphones which are used to receive user inputs (e.g., input as displayed in a search bar or a display of FIG. 13 on a computing device). Input/output circuitry 1312 may also correspond to a communication link between display 1310 and control circuitry 1308 such that display 1310 updates in response to inputs received via input/output circuitry 1312 (e.g., simultaneously update what is shown in display 1310 based on inputs received by generating corresponding outputs based on instructions stored in memory via a non-transitory, computer-readable medium).

Server 1304 and computing device 1302 may transmit and receive content and data such as media content via communication network 1306. For example, server 1304 may be a media content provider, and computing device 1302 may be a smart television configured to download or stream media content, such as a live news broadcast, from server 1304. Control circuitry 1334, 1308 may send and receive commands, requests, and other suitable data through communication network 1306 using communication circuitry 1332, 1326, respectively. Alternatively, control circuitry 1334, 1308 may communicate directly with each other using communication circuitry 1332, 1326, respectively, avoiding communication network 1306.

It is understood that computing device 1302 is not limited to the embodiments and methods shown and described herein. In nonlimiting examples, computing device 1302 may be a television, a Smart TV, a set-top box, an integrated receiver decoder (IRD) for handling satellite television, a digital storage device, a digital media receiver (DMR), a digital media adapter (DMA), a streaming media device, a DVD player, a DVD recorder, a connected DVD, a local media server, a BLU-RAY player, a BLU-RAY recorder, a personal computer (PC), a laptop computer, a tablet computer, a WebTV box, a personal computer television (PC/TV), a PC media server, a PC media center, a handheld computer, a stationary telephone, a personal digital assistant (PDA), a mobile telephone, a portable video player, a portable music player, a portable gaming machine, a smartphone, or any other device, computing equipment, or wireless device, and/or combination of the same, capable of suitably displaying and manipulating media content.

Computing device 1302 receives user input 1314 at input/output circuitry 1312. For example, computing device 1302 may receive a user input such as a user swipe or user touch. It is understood that computing device 1302 is not limited to the embodiments and methods shown and described herein.

User input 1314 may be received from a user selection-capturing interface that is separate from device 1302, such as a remote-control device, trackpad, or any other suitable user movement-sensitive, audio-sensitive or capture devices, or as part of device 1302, such as a touchscreen of display 1310. Transmission of user input 1314 to computing device 1302 may be accomplished using a wired connection, such as an audio cable, USB cable, ethernet cable and the like attached to a corresponding input port at a local device, or may be accomplished using a wireless connection, such as Bluetooth, Wi-Fi, WiMAX, GSM, UTMS, CDMA, TDMA, 8G, 4G, 4G LTE, 5G, or any other suitable wireless transmission protocol. Input/output circuitry 1312 may include a physical input port such as a 12.5 mm (0.4921 inch) audio jack, RCA audio jack, USB port, ethernet port, or any other suitable connection for receiving audio over a wired connection or may include a wireless receiver configured to receive data via Bluetooth, Wi-Fi, WiMAX, GSM, UTMS, CDMA, TDMA, 3G, 4G, 4G LTE, 5G, or other wireless transmission protocols.

Processing circuitry 1318 may receive user input 1314 from input/output circuitry 1312 using communication path 1316. Processing circuitry 1318 may convert or translate the received user input 1314 that may be in the form of audio data, visual data, gestures, or movement to digital signals. In some embodiments, input/output circuitry 1312 performs the translation to digital signals. In some embodiments, processing circuitry 1318 (or processing circuitry 1336, as the case may be) carries out disclosed processes and methods.

Processing circuitry 1318 may provide requests to storage 1322 by communication path 1320. Storage 1322 may provide requested information to processing circuitry 1318 by communication path 1346. Storage 1322 may transfer a request for information to communication circuitry 1326 which may translate or encode the request for information to a format receivable by communication network 1306 before transferring the request for information by communication path 1328. Communication network 1306 may forward the translated or encoded request for information to communication circuitry 1332, by communication path 1330.

At communication circuitry 1332, the translated or encoded request for information, received through communication path 1330, is translated or decoded for processing circuitry 1336, which will provide a response to the request for information based on information available through control circuitry 1334 or storage 1338, or a combination thereof. The response to the request for information is then provided back to communication network 1306 by communication path 1340 in an encoded or translated format such that communication network 1306 forwards the encoded or translated response back to communication circuitry 1326 by communication path 1342.

At communication circuitry 1326, the encoded or translated response to the request for information may be provided directly back to processing circuitry 1318 by communication path 1354 or may be provided to storage 1322 through communication path 1344, which then provides the information to processing circuitry 1318 by communication path 1346. Processing circuitry 1318 may also provide a request for information directly to communication circuitry 1326 through communication path 1352, where storage 1322 responds to an information request (provided through communication path 1320 or 1344) by communication path 1324 or 1346 that storage 1322 does not contain information pertaining to the request from processing circuitry 1318.

Processing circuitry 1318 may process the response to the request received through communication paths 1346 or 1354 and may provide instructions to display 1310 for a notification to be provided to the users through communication path 1348. Display 1310 may incorporate a timer for providing the notification or may rely on inputs through input/output circuitry 1312 from the user, which are forwarded through processing circuitry 1318 through communication path 1348, to determine how long or in what format to provide the notification. When display 1310 determines the display is completed, a notification may be provided to processing circuitry 1318 through communication path 1350.

The communication paths provided in FIG. 13 between computing device 1302, server 1304, communication network 1306, and all subcomponents depicted are examples and may be modified to reduce processing time or enhance processing capabilities for each step in the processes disclosed herein by one skilled in the art.

Terminology

The terminology used herein is for the purpose of describing particular embodiments only and is not intended to be limiting of the disclosure.

Throughout the present disclosure, the term "XR" includes without limitation extended reality (XR), augmented reality (AR), 3D content, 4D experiences, next-gen UIs, virtual reality (VR), mixed reality (MR) experiences, interactive experiences, a combination of the same, and the like.

As used herein, the terms "real time," "substantially in real time," "simultaneous," and the like are understood to be nearly instantaneous but may include delay due to practical limits of the system. Such delays may be on the order of milliseconds or microseconds, depending on the application and nature of the processing. Relatively longer delays (e.g., greater than a millisecond) may result due to communication or processing delays, particularly in remote and cloud computing environments.

As used herein, the singular forms "a," "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

Although at least one embodiment is described as using a plurality of units or modules to perform a process or processes, it is understood that the process or processes may also be performed by one or a plurality of units or modules. Additionally, it is understood that the term controller/control unit may refer to a hardware device that includes a memory and a processor. The memory may be configured to store the units or the modules and the processor may be specifically configured to execute said units or modules to perform one or more processes which are described herein.

Unless specifically stated or obvious from context, as used herein, the term "about" is understood as within a range of normal tolerance in the art, for example within 2 standard deviations of the mean. "About" may be understood as within 10%, 9%, 8%, 7%, 6%, 5%, 4%, 3%, 2%, 1%, 0.5%, 0.1%, 0.05%, or 0.01% of the stated value. Unless otherwise clear from the context, all numerical values provided herein are modified by the term "about."

The use of the terms "first", "second", "third", and so on, herein, are provided to identify structures or operations, without describing an order of structures or operations, and, to the extent the structures or operations are used in an embodiment, the structures may be provided or the operations may be executed in a different order from the stated order unless a specific order is definitely specified in the context.

The methods and/or any instructions for performing any of the embodiments discussed herein may be encoded on computer-readable media. Computer-readable media includes any media capable of storing data. The computer-readable media may be transitory, including, but not limited to, propagating electrical or electromagnetic signals, or may be non-transitory (e.g., a non-transitory, computer-readable medium accessible by an application via control or processing circuitry from storage) including, but not limited to, volatile and non-volatile computer memory or storage devices such as a hard disk, floppy disk, USB drive, DVD, CD, media cards, register memory, processor caches, random access memory (RAM), and the like.

The interfaces, processes, and analysis described may, in some embodiments, be performed by an application. The application may be loaded directly onto each device of any of the systems described or may be stored in a remote server or any memory and processing circuitry accessible to each device in the system. The generation of interfaces and analysis there-behind may be performed at a receiving device, a sending device, or some device or processor therebetween.

The systems and processes discussed herein are intended to be illustrative and not limiting. One skilled in the art would appreciate that the actions of the processes discussed herein may be omitted, modified, combined, and/or rearranged, and any additional actions may be performed without departing from the scope of the invention. More generally, the disclosure herein is meant to provide examples and is not limiting. Only the claims that follow are meant to set bounds as to what the present disclosure includes. Furthermore, it should be noted that the features and limitations described in any one embodiment may be applied to any other embodiment herein, and flowcharts or examples relating to one embodiment may be combined with any other embodiment in a suitable manner, done in different orders, or done in parallel. In addition, the methods and systems described herein may be performed in real time. It should also be noted that the methods and/or systems described herein may be applied to, or used in accordance with, other methods and/or systems.

This specification discloses embodiments, which include, but are not limited to, the following items:

Item 1. A method, comprising:
  modifying, at a first edge node, a content cache and a digital replica of a local environment based on extended reality (XR) content and a global anchoring map;
  transmitting, from the first edge node, the content cache and the digital replica of the local environment to a viewing client; and
  in response to a change in a condition impacting resource usage, transferring a portion of the modifying of the content cache and the digital replica of the local environment based on the XR content and the global anchoring map from the first edge node to a second edge node, wherein the second edge node is configured to perform:
    modifying, at the second edge node, the content cache and the digital replica of the local environment based on the XR content and the global anchoring map; and
    transmitting, from the second edge node, the content cache and the digital replica of the local environment to the viewing client.

Item 2. The method of item 1, comprising:
  generating, at a content authoring tool, an asset and a scene description;
  transmitting the asset and the scene description to a content server;
  generating, at the content server, the extended reality (XR) content and the global anchoring map based on the asset and the scene description;
  when the transferring of the modifying from the first edge node to the second edge node has not occurred, transmitting, from the content server, the XR content in accordance with the global anchoring map to the first edge node; and when the transferring of the modifying from the first edge node to the second edge node has occurred, transmitting, from the content server, the XR content in accordance with the global anchoring map to the second edge node.

Item 3. The method of item 1, wherein the viewing client is configured to monitor device capabilities.

Item 4. The method of item 3, wherein at least one of a haptics module, a graphics module, a camera module, an eye tracking module, or a user input module is configured to communicate with the viewing client, and
wherein the viewing client is configured to monitor device capabilities of the at least one of the haptics module, the graphics module, the camera module, the eye tracking module, or the user input module.

Item 5. The method of item 1, wherein the viewing client is configured to transmit output to at least one of a graphics output module or a haptics output module.

Item 6. The method of item 1, wherein the change in the condition impacting the resource usage includes at least one of a change in a condition of the viewing client, a change in a condition of the first edge node, a change in a condition of the second edge node, a change in a condition of a communication network linking the viewing client with the first edge node and/or the second edge node, or a change in a condition of the content.

Item 7. The method of item 2, comprising:
performing content pre-processing by:
generating, at the content authoring tool, the XR content, rules of adaptation, and the global anchoring map;
generating, at the content authoring tool, XR scene data and metadata based on the XR content, the rules of adaptation, and the global anchoring map; and
transmitting, from the content authoring tool, the XR scene data and the metadata to the content server.

Item 8. The method of item 7, comprising:
performing content streaming by:
receiving a content request from a user device;
transmitting the content request from the user device to the viewing client;
in response to receiving the content request, collecting, at the viewing client, device capabilities and session conditions;
receiving user input from a user device;
transmitting the user input from the user device to the viewing client;
in response to receiving the user input, processing, at the viewing client, the user input, and collecting device sensor data;
transmitting, from the viewing client, the device capabilities and the session conditions to the first edge node when transferring has not occurred or to the second edge node when transferring has occurred;
transmitting, from the viewing client, the user input and the sensor data to the first edge node when transferring has not occurred or to the second edge node when transferring has occurred;
adapting, at the first edge node or the second edge node, the XR content;
transmitting, from the first edge node or the second edge node, the content request to the content server;

selecting, at the content server, the XR content based on a location of the user device and the global anchoring map;
transmitting, from the content server, the XR scene data and the metadata to the first edge node or the second edge node;
updating, at the first edge node or the second edge node, the XR scene data, and rendering a view from a standpoint of the user device;
transmitting, from the first edge node or the second edge node, streaming output to the viewing client; and
transmitting, from the viewing client, the streaming output to the user device.

Item 9. The method of item 2, wherein the content server performs:
receiving a content request from the first edge node or the second edge node;
in response to receiving the request and the content request from the first edge node or the second edge node, determining whether the content request is based on a location;
in response to determining that the content request is based on the location, sending the XR content based on the global anchoring map; and
in response to determining that the content request is not based on the location, sending the XR content based on the content request.

Item 10. The method of item 1, wherein at least the first edge node or the second edge node is configured to perform session run-time processing based on a spatial computing server.

Item 11. The method of item 10, wherein the session run-time processing based on the spatial computing server comprises:
performing content adaptation based on content adaptation settings;
receiving user input from a user device and sensor data from the viewing client;
receiving a pose of the user device from the viewing client;
tracking based on the received sensor data;
updating the XR content based on the user input and the pose;
sending updated content assets for processing and viewing by the viewing client;
rendering scene assets;
encoding a rendered frame as a video stream; and
streaming the rendered frame to the viewing client.

Item 12. The method of item 1, wherein the viewing client is configured for viewing client capabilities by:
determining whether the viewing client has a processing budget;
in response to determining the viewing client has the processing budget, determining whether a power consumption threshold and/or a battery life threshold of the viewing client is exceeded;
in response to determining the power consumption threshold and/or the battery life threshold of the viewing client is not exceeded, determining whether the XR content has assets that are capable of being processed and rendered by the viewing client;
in response to determining that the XR content has assets that are capable of being processed and rendered by the viewing client, selecting content assets suitable for processing and rendering at the viewing client; and
selecting suitable assets within the processing budget.

Item 13. The method of item 1, wherein the first edge node or the second edge node is configured for:
adjusting a scene of the XR content according to session environmental conditions;
adjusting, in communication with a spatial computer server, the scene of the XR content according to environment geometry;
adjusting, in communication with a spatial computer server, the scene of the XR content according to environment lighting; and
adjusting rendering and post-processing settings according to the adjusted scene of the XR content.

Item 14. The method of item 1, comprising:
performing reference picture resampling (RPR) of the XR content; and
performing versatile video coding (VVC) of the XR content.

Item 15. The method of item 14, comprising:
transmitting, from the viewing client, user input and sensor data to the first edge node;
updating, at the first edge node, the XR content;
rendering, at the first edge node, output based on the XR content;
streaming, from the first edge node, the rendered output to the viewing client; and
advertising, from the second edge node, availability of a new node.

Item 16. The method of item 15, comprising:
in response to the change in the condition impacting the resource usage, transmitting, from the viewing client, a request for the new node to the second edge node;
in response to receiving the request for the new node, determining, at the second edge node, whether XR service is available;
in response to determining that the XR service is available at the second edge node, advertising availability of the XR service to the viewing client;
in response to receiving, at the viewing client, availability of the XR service, requesting an upload of session settings from the first edge node;
in response to receiving the request for the upload of the session settings, transmitting, from the first edge node, the session settings to a switch service;
in response to receiving, at the switch service, the session settings, transmitting, from the switch service, a session settings identifier, to the first edge node;
transmitting the session settings identifier from the first edge node to the viewing client;
transmitting, from the viewing client, the session settings identifier and an XR content request to the second edge node;
transmitting a content request from the second edge node to a content server;
transmitting an XR scene and metadata from the content server to the second edge node;
requesting, at the second edge node, session settings from the switch service; and
transmitting the session settings from the switch service to the second edge node.

Item 17. The method of item 16, comprising:
utilizing the RPR, transmitting the user input and the sensor data from the viewing client to the first edge node;
in response to receiving the user input and the sensor data from the viewing client:
updating, at the first edge node, the XR content;
rendering, at the first edge node, the output; and
streaming the output from the first edge node to the viewing client;
utilizing the RPR, transmitting the user input and the sensor data from the viewing client to the second edge node;
in response to receiving the user input and the sensor data from the viewing client:
adapting, at the second edge node, the XR content;
updating, at the second edge node, the XR content;
rendering, at the second edge node, the output; and
transmitting a signal that the second edge node is ready for handover from the second edge node to the viewing client.

Item 18. The method of item 17, comprising:
in response to receiving the signal that the second edge node is ready for handover:
transmitting, from the viewing client, a signal handover to the first edge node;
transmitting, from the viewing client, a signal handover to the second edge node; and
streaming the output from the second edge node to the viewing client.

Item 19. The method of item 1, comprising:
at the viewing client:
discovering availability of an edge node XR processing service at the first edge node or the second edge node;
requesting the XR content from the first edge node or the second edge node;
collecting client device capabilities and session conditions;
observing changes in the client device capabilities and the session conditions;
sending updates of the client device capabilities and the session conditions to the first edge node or the second edge node;
collecting user input and sensor data;
sending the user input and the sensor data to the first edge node or the second edge node;
receiving processing offloading settings from the first edge node or the second edge node;
downloading elements for local processing from the first edge node or the second edge node to a local cache;
determining whether local tracking can be performed; and
in response to determining that the local tracking can be performed:
resolving a pose of the device by analyzing the sensor data; and
sending the pose of the device to the first edge node or the second edge node.

Item 20. The method of item 19, comprising:
at the viewing client:
in response to determining that the local tracking cannot be performed or in response to the sending of the pose of the device to the first edge node or the second edge node:
receiving an update to a locally rendered element;
receiving an XR stream from the first edge node or the second edge node;
rendering the received XR stream;
rendering elements set to be rendered locally from the local cache;
combining renderings from the XR stream from the first edge node or the second edge node and the local rendering; and
outputting the combined renderings.

Item 21. A system, comprising:
a first edge node configured to modify a content cache and a digital replica of a local environment based on extended reality (XR) content and a global anchoring map;
a viewing client; and
a second edge node configured to modify the content cache and the digital replica of the local environment based on the XR content and the global anchoring map; and
circuitry configured to:
  transmit, from the first edge node, the content cache and the digital replica of the local environment to the viewing client;
  in response to a change in a condition impacting resource usage, transfer a portion of the modifying of the content cache and the digital replica of the local environment based on the XR content and the global anchoring map from the first edge node to the second edge node; and
  transmit, from the second edge node, the content cache and the digital replica of the local environment to the viewing client.

Item 22. The system of item 21, comprising:
a content authoring tool configured to generate an asset and a scene description; and
a content server configured to generate the extended reality (XR) content and the global anchoring map based on the asset and the scene description,
wherein the circuitry is configured to:
  transmit the asset and the scene description to the content server;
  when the transferring of the modifying from the first edge node to the second edge node has not occurred, transmit, from the content server, the XR content in accordance with the global anchoring map to the first edge node; and
  when the transferring of the modifying from the first edge node to the second edge node has occurred, transmit, from the content server, the XR content in accordance with the global anchoring map to the second edge node.

Item 23. The system of item 21, wherein the viewing client is configured to monitor device capabilities.

Item 24. The system of item 23, comprising:
at least one of a haptics module, a graphics module, a camera module, an eye tracking module, or a user input module configured to communicate with the viewing client,
wherein the viewing client is configured to monitor device capabilities of the at least one of the haptics module, the graphics module, the camera module, the eye tracking module, or the user input module.

Item 25. The system of item 21, wherein the viewing client is configured to transmit output to at least one of a graphics output module or a haptics output module.

Item 26. The system of item 21, wherein the change in the condition impacting the resource usage includes at least one of a change in a condition of the viewing client, a change in a condition of the first edge node, a change in a condition of the second edge node, a change in a condition of a communication network linking the viewing client with the first edge node and/or the second edge node, or a change in a condition of the content.

Item 27. The system of item 22, wherein the circuitry is configured to:
perform content pre-processing by:
  generating, at the content authoring tool, the XR content, rules of adaptation, and the global anchoring map;
  generating, at the content authoring tool, XR scene data and metadata based on the XR content, the rules of adaptation, and the global anchoring map; and
  transmitting, from the content authoring tool, the XR scene data and the metadata to the content server.

Item 28. The system of item 27, wherein the circuitry is configured to:
perform content streaming by:
  receiving a content request from a user device;
  transmitting the content request from the user device to the viewing client;
  in response to receiving the content request, collecting, at the viewing client, device capabilities and session conditions;
  receiving user input from a user device;
  transmitting the user input from the user device to the viewing client;
  in response to receiving the user input, processing, at the viewing client, the user input, and collecting device sensor data;
  transmitting, from the viewing client, the device capabilities and the session conditions to the first edge node when transferring has not occurred or to the second edge node when transferring has occurred;
  transmitting, from the viewing client, the user input and the sensor data to the first edge node when transferring has not occurred or to the second edge node when transferring has occurred;
  adapting, at the first edge node or the second edge node, the XR content;
  transmitting, from the first edge node or the second edge node, the content request to the content server;
  selecting, at the content server, the XR content based on a location of the user device and the global anchoring map;
  transmitting, from the content server, the XR scene data and the metadata to the first edge node or the second edge node;
  updating, at the first edge node or the second edge node, the XR scene data, and rendering a view from a standpoint of the user device;
  transmitting, from the first edge node or the second edge node, streaming output to the viewing client; and
  transmitting, from the viewing client, the streaming output to the user device.

Item 29. The system of item 22, wherein the content server performs:
  receiving a content request from the first edge node or the second edge node;
  in response to receiving the request and the content request from the first edge node or the second edge node, determining whether the content request is based on a location;
  in response to determining that the content request is based on the location, sending the XR content based on the global anchoring map; and
  in response to determining that the content request is not based on the location, sending the XR content based on the content request.

Item 30. The system of item 21, wherein at least the first edge node or the second edge node is configured to perform session run-time processing based on a spatial computing server.

Item 31. The system of item 30, wherein the session run-time processing based on the spatial computing server comprises:
  performing content adaptation based on content adaptation settings;
  receiving user input from a user device and sensor data from the viewing client;
  receiving a pose of the user device from the viewing client;
  tracking based on the received sensor data;
  updating the XR content based on the user input and the pose;
  sending updated content assets for processing and viewing by the viewing client;
  rendering scene assets;
  encoding a rendered frame as a video stream; and
  streaming the rendered frame to the viewing client.

Item 32. The system of item 21, wherein the viewing client is configured for viewing client capabilities by:
  determining whether the viewing client has a processing budget;
  in response to determining the viewing client has the processing budget, determining whether a power consumption threshold and/or a battery life threshold of the viewing client is exceeded;
  in response to determining the power consumption threshold and/or the battery life threshold of the viewing client is not exceeded, determining whether the XR content has assets that are capable of being processed and rendered by the viewing client;
  in response to determining that the XR content has assets that are capable of being processed and rendered by the viewing client, selecting content assets suitable for processing and rendering at the viewing client; and
  selecting suitable assets within the processing budget.

Item 33. The system of item 21, wherein the first edge node or the second edge node is configured for:
  adjusting a scene of the XR content according to session environmental conditions;
  adjusting, in communication with a spatial computer server, the scene of the XR content according to environment geometry;
  adjusting, in communication with a spatial computer server, the scene of the XR content according to environment lighting; and
  adjusting rendering and post-processing settings according to the adjusted scene of the XR content.

Item 34. The system of item 21, wherein the circuitry is configured to:
  perform reference picture resampling (RPR) of the XR content; and
  perform versatile video coding (VVC) of the XR content.

Item 35. The system of item 34, wherein the circuitry is configured to:
  transmit, from the viewing client, user input and sensor data to the first edge node;
  update, at the first edge node, the XR content;
  render, at the first edge node, output based on the XR content;
  stream, from the first edge node, the rendered output to the viewing client; and
  advertise, from the second edge node, availability of a new node.

Item 36. The system of item 35, wherein the circuitry is configured to:
  in response to the change in the condition impacting the resource usage, transmit, from the viewing client, a request for the new node to the second edge node;
  in response to receiving the request for the new node, determine, at the second edge node, whether XR service is available;
  in response to determining that the XR service is available at the second edge node, advertise availability of the XR service to the viewing client;
  in response to receiving, at the viewing client, availability of the XR service, request an upload of session settings from the first edge node;
  in response to receiving the request for the upload of the session settings, transmit, from the first edge node, the session settings to a switch service;
  in response to receiving, at the switch service, the session settings, transmit, from the switch service, a session settings identifier, to the first edge node;
  transmit the session settings identifier from the first edge node to the viewing client;
  transmit, from the viewing client, the session settings identifier and an XR content request to the second edge node;
  transmit a content request from the second edge node to a content server;
  transmit an XR scene and metadata from the content server to the second edge node;
  request, at the second edge node, session settings from the switch service; and
  transmit the session settings from the switch service to the second edge node.

Item 37. The system of item 36, wherein the circuitry is configured to:
  utilizing the RPR, transmit the user input and the sensor data from the viewing client to the first edge node;
  in response to receiving the user input and the sensor data from the viewing client:
    update, at the first edge node, the XR content;
    render, at the first edge node, the output; and
    stream the output from the first edge node to the viewing client;
  utilizing the RPR, transmit the user input and the sensor data from the viewing client to the second edge node;
  in response to receiving the user input and the sensor data from the viewing client:
    adapt, at the second edge node, the XR content;
    update, at the second edge node, the XR content;
    render, at the second edge node, the output; and
    transmit a signal that the second edge node is ready for handover from the second edge node to the viewing client.

Item 38. The system of item 37, wherein the circuitry is configured to:
  in response to receiving the signal that the second edge node is ready for handover:
    transmit, from the viewing client, a signal handover to the first edge node;
    transmit, from the viewing client, a signal handover to the second edge node; and
    stream the output from the second edge node to the viewing client.

Item 39. The system of item 21, wherein the viewing client is configured to:
  discover availability of an edge node XR processing service at the first edge node or the second edge node;

request the XR content from the first edge node or the second edge node;
collect client device capabilities and session conditions;
observe changes in the client device capabilities and the session conditions;
send updates of the client device capabilities and the session conditions to the first edge node or the second edge node;
collect user input and sensor data;
send the user input and the sensor data to the first edge node or the second edge node;
receive processing offloading settings from the first edge node or the second edge node;
download elements for local processing from the first edge node or the second edge node to a local cache;
determine whether local tracking can be performed; and
in response to determining that the local tracking can be performed:
resolve a pose of the device by analyzing the sensor data; and
send the pose of the device to the first edge node or the second edge node.

Item 40. The system of item 39, wherein the viewing client is configured to:
in response to determining that the local tracking cannot be performed or in response to the sending of the pose of the device to the first edge node or the second edge node:
receive an update to a locally rendered element;
receive an XR stream from the first edge node or the second edge node;
render the received XR stream;
render elements set to be rendered locally from the local cache;
combine renderings from the XR stream from the first edge node or the second edge node and the local rendering; and
output the combined renderings.

41. A non-transitory, computer-readable medium having non-transitory computer-readable instructions encoded thereon that, when executed by control circuitry, cause the control circuitry to:
modify, at a first edge node, a content cache and a digital replica of a local environment based on extended reality (XR) content and a global anchoring map;
transmit, from the first edge node, the content cache and the digital replica of the local environment to a viewing client; and
in response to a change in a condition impacting resource usage, transfer a portion of the modifying of the content cache and the digital replica of the local environment based on the XR content and the global anchoring map from the first edge node to a second edge node, wherein the second edge node is configured to:
modify, at the second edge node, the content cache and the digital replica of the local environment based on the XR content and the global anchoring map; and
transmit, from the second edge node, the content cache and the digital replica of the local environment to the viewing client.

Item 42. The non-transitory, computer-readable medium of item 41, having non-transitory computer-readable instructions encoded thereon that, when executed by control circuitry, cause the control circuitry to:
generate, at a content authoring tool, an asset and a scene description;
transmit the asset and the scene description to a content server;
generate, at the content server, the extended reality (XR) content and the global anchoring map based on the asset and the scene description;
when the transferring of the modifying from the first edge node to the second edge node has not occurred, transmit, from the content server, the XR content in accordance with the global anchoring map to the first edge node; and
when the transferring of the modifying from the first edge node to the second edge node has occurred, transmit, from the content server, the XR content in accordance with the global anchoring map to the second edge node.

Item 43. The non-transitory, computer-readable medium of item 41, wherein the viewing client is configured to monitor device capabilities.

Item 44. The non-transitory, computer-readable medium of item 43, wherein at least one of a haptics module, a graphics module, a camera module, an eye tracking module, or a user input module is configured to communicate with the viewing client, and
wherein the viewing client is configured to monitor device capabilities of the at least one of the haptics module, the graphics module, the camera module, the eye tracking module, or the user input module.

Item 45. The non-transitory, computer-readable medium of item 41, wherein the viewing client is configured to transmit output to at least one of a graphics output module or a haptics output module.

Item 46. The non-transitory, computer-readable medium of item 41, wherein the change in the condition impacting the resource usage includes at least one of a change in a condition of the viewing client, a change in a condition of the first edge node, a change in a condition of the second edge node, a change in a condition of a communication network linking the viewing client with the first edge node and/or the second edge node, or a change in a condition of the content.

Item 47. The non-transitory, computer-readable medium of item 42, having non-transitory computer-readable instructions encoded thereon that, when executed by control circuitry, cause the control circuitry to:
perform content pre-processing by:
generating, at the content authoring tool, the XR content, rules of adaptation, and the global anchoring map;
generating, at the content authoring tool, XR scene data and metadata based on the XR content, the rules of adaptation, and the global anchoring map; and
transmitting, from the content authoring tool, the XR scene data and the metadata to the content server.

Item 48. The non-transitory, computer-readable medium of item 47, having non-transitory computer-readable instructions encoded thereon that, when executed by control circuitry, cause the control circuitry to:
perform content streaming by:
receiving a content request from a user device;
transmitting the content request from the user device to the viewing client;
in response to receiving the content request, collecting, at the viewing client, device capabilities and session conditions;
receiving user input from a user device;
transmitting the user input from the user device to the viewing client;

in response to receiving the user input, processing, at the viewing client, the user input, and collecting sensor data;

transmitting, from the viewing client, the device capabilities and the session conditions to the first edge node when transferring has not occurred or to the second edge node when transferring has occurred;

transmitting, from the viewing client, the user input and the sensor data to the first edge node when transferring has not occurred or to the second edge node when transferring has occurred;

adapting, at the first edge node or the second edge node, the XR content;

transmitting, from the first edge node or the second edge node, the content request to the content server;

selecting, at the content server, the XR content based on a location of the user device and the global anchoring map;

transmitting, from the content server, the XR scene data and the metadata to the first edge node or the second edge node;

updating, at the first edge node or the second edge node, the XR scene data, and rendering a view from a standpoint of the user device;

transmitting, from the first edge node or the second edge node, streaming output to the viewing client; and transmitting, from the viewing client, the streaming output to the user device.

Item 49. The non-transitory, computer-readable medium of item 42, wherein the content server performs:

receiving a content request from the first edge node or the second edge node;

in response to receiving the request and the content request from the first edge node or the second edge node, determining whether the content request is based on a location;

in response to determining that the content request is based on the location, sending the XR content based on the global anchoring map; and in response to determining that the content request is not based on the location, sending the XR content based on the content request.

Item 50. The non-transitory, computer-readable medium of item 41, wherein at least the first edge node or the second edge node is configured to perform session run-time processing based on a spatial computing server.

Item 51. The non-transitory, computer-readable medium of item 50, wherein the session run-time processing based on the spatial computing server comprises:

performing content adaptation based on content adaptation settings;

receiving user input from a user device and sensor data from the viewing client;

receiving a pose of the user device from the viewing client;

tracking based on the received sensor data;

updating the XR content based on the user input and the pose;

sending updated content assets for processing and viewing by the viewing client;

rendering scene assets;

encoding a rendered frame as a video stream; and streaming the rendered frame to the viewing client.

Item 52. The non-transitory, computer-readable medium of item 41, wherein the viewing client is configured for viewing client capabilities by:

determining whether the viewing client has a processing budget;

in response to determining the viewing client has the processing budget, determining whether a power consumption threshold and/or a battery life threshold of the viewing client is exceeded;

in response to determining the power consumption threshold and/or the battery life threshold of the viewing client is not exceeded, determining whether the XR content has assets that are capable of being processed and rendered by the viewing client;

in response to determining that the XR content has assets that are capable of being processed and rendered by the viewing client, selecting content assets suitable for processing and rendering at the viewing client; and selecting suitable assets within the processing budget.

Item 53. The non-transitory, computer-readable medium of item 41, wherein the first edge node or the second edge node is configured for:

adjusting a scene of the XR content according to session environmental conditions;

adjusting, in communication with a spatial computer server, the scene of the XR content according to environment geometry;

adjusting, in communication with a spatial computer server, the scene of the XR content according to environment lighting; and adjusting rendering and post-processing settings according to the adjusted scene of the XR content.

Item 54. The non-transitory, computer-readable medium of item 41, having non-transitory computer-readable instructions encoded thereon that, when executed by control circuitry, cause the control circuitry to:

perform reference picture resampling (RPR) of the XR content; and perform versatile video coding (VVC) of the XR content.

Item 55. The non-transitory, computer-readable medium of item 54, having non-transitory computer-readable instructions encoded thereon that, when executed by control circuitry, cause the control circuitry to:

transmit, from the viewing client, user input and sensor data to the first edge node;

update, at the first edge node, the XR content;

render, at the first edge node, output based on the XR content;

stream, from the first edge node, the rendered output to the viewing client; and advertise, from the second edge node, availability of a new node.

Item 56. The non-transitory, computer-readable medium of item 55, having non-transitory computer-readable instructions encoded thereon that, when executed by control circuitry, cause the control circuitry to:

in response to the change in the condition impacting the resource usage, transmit, from the viewing client, a request for the new node to the second edge node;

in response to receiving the request for the new node, determine, at the second edge node, whether XR service is available;

in response to determining that the XR service is available at the second edge node, advertise availability of the XR service to the viewing client;

in response to receiving, at the viewing client, availability of the XR service, request an upload of session settings from the first edge node;

in response to receiving the request for the upload of the session settings, transmit, from the first edge node, the session settings to a switch service;
in response to receiving, at the switch service, the session settings, transmit, from the switch service, a session settings identifier, to the first edge node;
transmit the session settings identifier from the first edge node to the viewing client;
transmit, from the viewing client, the session settings identifier and an XR content request to the second edge node;
transmit a content request from the second edge node to a content server;
transmit an XR scene and metadata from the content server to the second edge node;
request, at the second edge node, session settings from the switch service; and
transmit the session settings from the switch service to the second edge node.

Item 57. The non-transitory, computer-readable medium of item 56, having non-transitory computer-readable instructions encoded thereon that, when executed by control circuitry, cause the control circuitry to:
utilize the RPR, and transmit the user input and the sensor data from the viewing client to the first edge node;
in response to receiving the user input and the sensor data from the viewing client:
update, at the first edge node, the XR content;
render, at the first edge node, the output; and
stream the output from the first edge node to the viewing client;
utilize the RPR, and transmit the user input and the sensor data from the viewing client to the second edge node;
in response to receiving the user input and the sensor data from the viewing client:
adapt, at the second edge node, the XR content;
update, at the second edge node, the XR content;
render, at the second edge node, the output; and
transmit a signal that the second edge node is ready for handover from the second edge node to the viewing client.

Item 58. The non-transitory, computer-readable medium of item 57, having non-transitory computer-readable instructions encoded thereon that, when executed by control circuitry, cause the control circuitry to:
in response to receiving the signal that the second edge node is ready for handover:
transmit, from the viewing client, a signal handover to the first edge node;
transmit, from the viewing client, a signal handover to the second edge node; and
stream the output from the second edge node to the viewing client.

Item 59. The non-transitory, computer-readable medium of item 41, having non-transitory computer-readable instructions encoded thereon that, when executed by control circuitry, cause the control circuitry to:
at the viewing client:
discover availability of an edge node XR processing service at the first edge node or the second edge node;
request the XR content from the first edge node or the second edge node;
collect client device capabilities and session conditions;
observe changes in the client device capabilities and the session conditions;
send updates of the client device capabilities and the session conditions to the first edge node or the second edge node;
collect user input and sensor data;
send the user input and the sensor data to the first edge node or the second edge node;
receive processing offloading settings from the first edge node or the second edge node;
download elements for local processing from the first edge node or the second edge node to a local cache;
determine whether local tracking can be performed; and
in response to determining that the local tracking can be performed:
resolve a pose of the device by analyzing the sensor data; and
send the pose of the device to the first edge node or the second edge node.

Item 60. The non-transitory, computer-readable medium of item 59, having non-transitory computer-readable instructions encoded thereon that, when executed by control circuitry, cause the control circuitry to:
at the viewing client:
in response to determining that the local tracking cannot be performed or in response to the sending of the pose of the device to the first edge node or the second edge node:
receive an update to a locally rendered element;
receive an XR stream from the first edge node or the second edge node;
render the received XR stream;
render elements set to be rendered locally from the local cache;
combine renderings from the XR stream from the first edge node or the second edge node and the local rendering; and
output the combined renderings.

61. A device, comprising:
means for modifying, at a first edge node, a content cache and a digital replica of a local environment based on extended reality (XR) content and a global anchoring map;
means for transmitting, from the first edge node, the content cache and the digital replica of the local environment to a viewing client; and
means for, in response to a change in a condition impacting resource usage, transferring a portion of the modifying of the content cache and the digital replica of the local environment based on the XR content and the global anchoring map from the first edge node to a second edge node, wherein the second edge node is configured to perform:
modifying, at the second edge node, the content cache and the digital replica of the local environment based on the XR content and the global anchoring map; and
transmitting, from the second edge node, the content cache and the digital replica of the local environment to the viewing client.

Item 62. The device of item 61, comprising:
means for generating, at a content authoring tool, an asset and a scene description;
means for transmitting the asset and the scene description to a content server;
means for generating, at the content server, the extended reality (XR) content and the global anchoring map based on the asset and the scene description;

means for, when the transferring of the modifying from the first edge node to the second edge node has not occurred, transmitting, from the content server, the XR content in accordance with the global anchoring map to the first edge node; and means for, when the transferring of the modifying from the first edge node to the second edge node has occurred, transmitting, from the content server, the XR content in accordance with the global anchoring map to the second edge node.

Item 63. The device of item 61, wherein the viewing client is configured to monitor device capabilities.

Item 64. The device of item 63, wherein at least one of a haptics module, a graphics module, a camera module, an eye tracking module, or a user input module is configured to communicate with the viewing client, and wherein the viewing client is configured to monitor device capabilities of the at least one of the haptics module, the graphics module, the camera module, the eye tracking module, or the user input module.

Item 65. The device of item 61, wherein the viewing client is configured to transmit output to at least one of a graphics output module or a haptics output module.

Item 66. The device of item 61, wherein the change in the condition impacting the resource usage includes at least one of a change in a condition of the viewing client, a change in a condition of the first edge node, a change in a condition of the second edge node, a change in a condition of a communication network linking the viewing client with the first edge node and/or the second edge node, or a change in a condition of the content.

Item 67. The device of item 62, comprising:
means for performing content pre-processing by:
generating, at the content authoring tool, the XR content, rules of adaptation, and the global anchoring map;
generating, at the content authoring tool, XR scene data and metadata based on the XR content, the rules of adaptation, and the global anchoring map; and
transmitting, from the content authoring tool, the XR scene data and the metadata to the content server.

Item 68. The device of item 67, comprising:
means for performing content streaming by:
receiving a content request from a user device;
transmitting the content request from the user device to the viewing client;
in response to receiving the content request, collecting, at the viewing client, device capabilities and session conditions;
receiving user input from a user device;
transmitting the user input from the user device to the viewing client;
in response to receiving the user input, processing, at the viewing client, the user input, and collecting sensor data;
transmitting, from the viewing client, the device capabilities and the session conditions to the first edge node when transferring has not occurred or to the second edge node when transferring has occurred;
transmitting, from the viewing client, the user input and the sensor data to the first edge node when transferring has not occurred or to the second edge node when transferring has occurred;
adapting, at the first edge node or the second edge node, the XR content;
transmitting, from the first edge node or the second edge node, the content request to the content server;
selecting, at the content server, the XR content based on a location of the user device and the global anchoring map;
transmitting, from the content server, the XR scene data and the metadata to the first edge node or the second edge node;
updating, at the first edge node or the second edge node, the XR scene data, and rendering a view from a standpoint of the user device;
transmitting, from the first edge node or the second edge node, streaming output to the viewing client; and
transmitting, from the viewing client, the streaming output to the user device.

Item 69. The device of item 62, wherein the content server performs:
receiving a content request from the first edge node or the second edge node;
in response to receiving the request and the content request from the first edge node or the second edge node, determining whether the content request is based on a location;
in response to determining that the content request is based on the location, sending the XR content based on the global anchoring map; and
in response to determining that the content request is not based on the location, sending the XR content based on the content request.

Item 70. The device of item 61, wherein at least the first edge node or the second edge node is configured to perform session run-time processing based on a spatial computing server.

Item 71. The device of item 70, wherein the session run-time processing based on the spatial computing server comprises:
means for performing content adaptation based on content adaptation settings;
means for receiving user input from a user device and sensor data from the viewing client;
means for receiving a pose of the user device from the viewing client;
means for tracking based on the received sensor data;
means for updating the XR content based on the user input and the pose;
means for sending updated content assets for processing and viewing by the viewing client;
means for rendering scene assets;
means for encoding a rendered frame as a video stream; and
means for streaming the rendered frame to the viewing client.

Item 72. The device of item 61, wherein the viewing client is configured for viewing client capabilities by:
determining whether the viewing client has a processing budget;
in response to determining the viewing client has the processing budget, determining whether a power consumption threshold and/or a battery life threshold of the viewing client is exceeded;
in response to determining the power consumption threshold and/or the battery life threshold of the viewing client is not exceeded, determining whether the XR content has assets that are capable of being processed and rendered by the viewing client;
in response to determining that the XR content has assets that are capable of being processed and rendered by the viewing client, selecting content assets suitable for processing and rendering at the viewing client; and
selecting suitable assets within the processing budget.

Item 73. The device of item 61, wherein the first edge node or the second edge node is configured for:
adjusting a scene of the XR content according to session environmental conditions;
adjusting, in communication with a spatial computer server, the scene of the XR content according to environment geometry;
adjusting, in communication with a spatial computer server, the scene of the XR content according to environment lighting; and
adjusting rendering and post-processing settings according to the adjusted scene of the XR content.

Item 74. The device of item 61, comprising:
means for performing reference picture resampling (RPR) of the XR content; and
means for performing versatile video coding (VVC) of the XR content.

Item 75. The device of item 74, comprising:
means for transmitting, from the viewing client, user input and sensor data to the first edge node;
means for updating, at the first edge node, the XR content;
means for rendering, at the first edge node, output based on the XR content;
means for streaming, from the first edge node, the rendered output to the viewing client; and
means for advertising, from the second edge node, availability of a new node.

Item 76. The device of item 75, comprising:
means for, in response to the change in the condition impacting the resource usage, transmitting, from the viewing client, a request for the new node to the second edge node;
means for, in response to receiving the request for the new node, determining, at the second edge node, whether XR service is available;
means for, in response to determining that the XR service is available at the second edge node, advertising availability of the XR service to the viewing client;
means for, in response to receiving, at the viewing client, availability of the XR service, requesting an upload of session settings from the first edge node;
means for, in response to receiving the request for the upload of the session settings, transmitting, from the first edge node, the session settings to a switch service;
means for, in response to receiving, at the switch service, the session settings, transmitting, from the switch service, a session settings identifier, to the first edge node;
means for transmitting the session settings identifier from the first edge node to the viewing client;
means for transmitting, from the viewing client, the session settings identifier and an XR content request to the second edge node;
means for transmitting a content request from the second edge node to a content server;
means for transmitting an XR scene and metadata from the content server to the second edge node;
means for requesting, at the second edge node, session settings from the switch service; and
means for transmitting the session settings from the switch service to the second edge node.

Item 77. The device of item 76, comprising:
utilizing the RPR, means for transmitting the user input and the sensor data from the viewing client to the first edge node;
in response to receiving the user input and the sensor data from the viewing client:
updating, at the first edge node, the XR content;
rendering, at the first edge node, the output; and
streaming the output from the first edge node to the viewing client;
utilizing the RPR, means for transmitting the user input and the sensor data from the viewing client to the second edge node;
in response to receiving the user input and the sensor data from the viewing client:
adapting, at the second edge node, the XR content;
updating, at the second edge node, the XR content;
rendering, at the second edge node, the output; and
transmitting a signal that the second edge node is ready for handover from the second edge node to the viewing client.

Item 78. The device of item 77, comprising:
means for, in response to receiving the signal that the second edge node is ready for handover:
transmitting, from the viewing client, a signal handover to the first edge node;
transmitting, from the viewing client, a signal handover to the second edge node; and
streaming the output from the second edge node to the viewing client.

Item 79. The device of item 61, comprising:
at the viewing client:
means for discovering availability of an edge node XR processing service at the first edge node or the second edge node;
means for requesting the XR content from the first edge node or the second edge node;
means for collecting client device capabilities and session conditions;
means for observing changes in the client device capabilities and the session conditions;
means for sending updates of the client device capabilities and the session conditions to the first edge node or the second edge node;
means for collecting user input and sensor data;
means for sending the user input and the sensor data to the first edge node or the second edge node;
means for receiving processing offloading settings from the first edge node or the second edge node;
means for downloading elements for local processing from the first edge node or the second edge node to a local cache;
means for determining whether local tracking can be performed; and
means for, in response to determining that the local tracking can be performed:
resolving a pose of the device by analyzing the sensor data; and
sending the pose of the device to the first edge node or the second edge node.

Item 80. The device of item 79, comprising:
at the viewing client:
means for, in response to determining that the local tracking cannot be performed or in response to the sending of the pose of the device to the first edge node or the second edge node:
receiving an update to a locally rendered element;
receiving an XR stream from the first edge node or the second edge node;

rendering the received XR stream;
rendering elements set to be rendered locally from the local cache;
combining renderings from the XR stream from the first edge node or the second edge node and the local rendering; and
outputting the combined renderings.

81. A method, comprising:
modifying, at a first edge node, a content cache and a digital replica of a local environment based on extended reality (XR) content and a global anchoring map;
utilizing circuitry configured therefor, transmitting, from the first edge node, the content cache and the digital replica of the local environment to a viewing client; and
utilizing the circuitry, in response to a change in a condition impacting resource usage, transferring a portion of the modifying of the content cache and the digital replica of the local environment based on the XR content and the global anchoring map from the first edge node to a second edge node, wherein the second edge node is configured to perform:
modifying, at the second edge node, the content cache and the digital replica of the local environment based on the XR content and the global anchoring map; and
transmitting, from the second edge node, the content cache and the digital replica of the local environment to the viewing client.

Item 82. The method of item 81, comprising:
generating, at a content authoring tool, an asset and a scene description;
transmitting the asset and the scene description to a content server;
generating, at the content server, the extended reality (XR) content and the global anchoring map based on the asset and the scene description;
when the transferring of the modifying from the first edge node to the second edge node has not occurred, transmitting, from the content server, the XR content in accordance with the global anchoring map to the first edge node; and
when the transferring of the modifying from the first edge node to the second edge node has occurred, transmitting, from the content server, the XR content in accordance with the global anchoring map to the second edge node.

Item 83. The method of any of items 81-82, wherein the viewing client is configured to monitor device capabilities.

Item 84. The method of item 83, wherein at least one of a haptics module, a graphics module, a camera module, an eye tracking module, or a user input module is configured to communicate with the viewing client, and
wherein the viewing client is configured to monitor device capabilities of the at least one of the haptics module, the graphics module, the camera module, the eye tracking module, or the user input module.

Item 85. The method of any of items 81-84, wherein the viewing client is configured to transmit output to at least one of a graphics output module or a haptics output module.

Item 86. The method of any of items 81-85, wherein the change in the condition impacting the resource usage includes at least one of a change in a condition of the viewing client, a change in a condition of the first edge node, a change in a condition of the second edge node, a change in a condition of a communication network linking the viewing client with the first edge node and/or the second edge node, or a change in a condition of the content.

Item 87. The method of any of items 82-86, comprising:
performing content pre-processing by:
generating, at the content authoring tool, the XR content, rules of adaptation, and the global anchoring map;
generating, at the content authoring tool, XR scene data and metadata based on the XR content, the rules of adaptation, and the global anchoring map; and
transmitting, from the content authoring tool, the XR scene data and the metadata to the content server.

Item 88. The method of item 87, comprising:
performing content streaming by:
receiving a content request from a user device;
transmitting the content request from the user device to the viewing client;
in response to receiving the content request, collecting, at the viewing client, device capabilities and session conditions;
receiving user input from a user device;
transmitting the user input from the user device to the viewing client;
in response to receiving the user input, processing, at the viewing client, the user input, and collecting sensor data;
transmitting, from the viewing client, the device capabilities and the session conditions to the first edge node when transferring has not occurred or to the second edge node when transferring has occurred;
transmitting, from the viewing client, the user input and the sensor data to the first edge node when transferring has not occurred or to the second edge node when transferring has occurred;
adapting, at the first edge node or the second edge node, the XR content;
transmitting, from the first edge node or the second edge node, the content request to the content server;
selecting, at the content server, the XR content based on a location of the user device and the global anchoring map;
transmitting, from the content server, the XR scene data and the metadata to the first edge node or the second edge node;
updating, at the first edge node or the second edge node, the XR scene data, and rendering a view from a standpoint of the user device;
transmitting, from the first edge node or the second edge node, streaming output to the viewing client; and
transmitting, from the viewing client, the streaming output to the user device.

Item 89. The method of any of items 82-88, wherein the content server performs:
receiving a content request from the first edge node or the second edge node;
in response to receiving the request and the content request from the first edge node or the second edge node, determining whether the content request is based on a location;
in response to determining that the content request is based on the location, sending the XR content based on the global anchoring map; and
in response to determining that the content request is not based on the location, sending the XR content based on the content request.

Item 90. The method of any of items 81-89, wherein at least the first edge node or the second edge node is configured to perform session run-time processing based on a spatial computing server.

Item 91. The method of item 90, wherein the session run-time processing based on the spatial computing server comprises:
performing content adaptation based on content adaptation settings;
receiving user input from a user device and sensor data from the viewing client;
receiving a pose of the user device from the viewing client;
tracking based on the received sensor data;
updating the XR content based on the user input and the pose;
sending updated content assets for processing and viewing by the viewing client;
rendering scene assets;
encoding a rendered frame as a video stream; and
streaming the rendered frame to the viewing client.

Item 92. The method of any of items 81-91, wherein the viewing client is configured for viewing client capabilities by:
determining whether the viewing client has a processing budget;
in response to determining the viewing client has the processing budget, determining whether a power consumption threshold and/or a battery life threshold of the viewing client is exceeded;
in response to determining the power consumption threshold and/or the battery life threshold of the viewing client is not exceeded, determining whether the XR content has assets that are capable of being processed and rendered by the viewing client;
in response to determining that the XR content has assets that are capable of being processed and rendered by the viewing client, selecting content assets suitable for processing and rendering at the viewing client; and
selecting suitable assets within the processing budget.

Item 93. The method of any of items 81-92, wherein the first edge node or the second edge node is configured for:
adjusting a scene of the XR content according to session environmental conditions;
adjusting, in communication with a spatial computer server, the scene of the XR content according to environment geometry;
adjusting, in communication with a spatial computer server, the scene of the XR content according to environment lighting; and
adjusting rendering and post-processing settings according to the adjusted scene of the XR content.

Item 94. The method of any of items 81-93, comprising:
performing reference picture resampling (RPR) of the XR content; and
performing versatile video coding (VVC) of the XR content.

Item 95. The method of item 94, comprising:
transmitting, from the viewing client, user input and sensor data to the first edge node;
updating, at the first edge node, the XR content;
rendering, at the first edge node, output based on the XR content;
streaming, from the first edge node, the rendered output to the viewing client; and
advertising, from the second edge node, availability of a new node.

Item 96. The method of item 95, comprising:
in response to the change in the condition impacting the resource usage, transmitting, from the viewing client, a request for the new node to the second edge node;
in response to receiving the request for the new node, determining, at the second edge node, whether XR service is available;
in response to determining that the XR service is available at the second edge node, advertising availability of the XR service to the viewing client;
in response to receiving, at the viewing client, availability of the XR service, requesting an upload of session settings from the first edge node;
in response to receiving the request for the upload of the session settings, transmitting, from the first edge node, the session settings to a switch service;
in response to receiving, at the switch service, the session settings, transmitting, from the switch service, a session settings identifier, to the first edge node;
transmitting the session settings identifier from the first edge node to the viewing client;
transmitting, from the viewing client, the session settings identifier and an XR content request to the second edge node;
transmitting a content request from the second edge node to a content server;
transmitting an XR scene and metadata from the content server to the second edge node;
requesting, at the second edge node, session settings from the switch service; and
transmitting the session settings from the switch service to the second edge node.

Item 97. The method of item 96, comprising:
utilizing the RPR, transmitting the user input and the sensor data from the viewing client to the first edge node;
in response to receiving the user input and the sensor data from the viewing client:
updating, at the first edge node, the XR content;
rendering, at the first edge node, the output; and
streaming the output from the first edge node to the viewing client;
utilizing the RPR, transmitting the user input and the sensor data from the viewing client to the second edge node;
in response to receiving the user input and the sensor data from the viewing client:
adapting, at the second edge node, the XR content;
updating, at the second edge node, the XR content;
rendering, at the second edge node, the output; and
transmitting a signal that the second edge node is ready for handover from the second edge node to the viewing client.

Item 98. The method of item 97, comprising:
in response to receiving the signal that the second edge node is ready for handover:
transmitting, from the viewing client, a signal handover to the first edge node;
transmitting, from the viewing client, a signal handover to the second edge node; and
streaming the output from the second edge node to the viewing client.

Item 99. The method of any of items 81-98, comprising:
at the viewing client:
discovering availability of an edge node XR processing service at the first edge node or the second edge node;

requesting the XR content from the first edge node or the second edge node;
collecting client device capabilities and session conditions;
observing changes in the client device capabilities and the session conditions;
sending updates of the client device capabilities and the session conditions to the first edge node or the second edge node;
collecting user input and sensor data;
sending the user input and the sensor data to the first edge node or the second edge node;
receiving processing offloading settings from the first edge node or the second edge node;
downloading elements for local processing from the first edge node or the second edge node to a local cache;
determining whether local tracking can be performed; and
in response to determining that the local tracking can be performed:
resolving a pose of the device by analyzing the sensor data; and
sending the pose of the device to the first edge node or the second edge node.

Item 100. The method of item 99, comprising:
at the viewing client:
in response to determining that the local tracking cannot be performed or in response to the sending of the pose of the device to the first edge node or the second edge node:
receiving an update to a locally rendered element;
receiving an XR stream from the first edge node or the second edge node;
rendering the received XR stream;
rendering elements set to be rendered locally from the local cache;
combining renderings from the XR stream from the first edge node or the second edge node and the local rendering; and
outputting the combined renderings.

Accordingly, this description is to be taken only by way of example and not to otherwise limit the scope of the embodiments herein. Therefore, it is the object of the appended claims to cover all such variations and modifications as come within the true spirit and scope of the embodiments herein.

What is claimed is:

1. A method, comprising:
modifying, at a first edge node, a content cache and a digital replica of a local environment based on extended reality (XR) content and a global anchoring map;
transmitting, from the first edge node, data of the content cache and the digital replica of the local environment to a viewing client; and
based at least in part on a change in a condition impacting resource usage, transferring at least a portion of the modifying of the content cache and the digital replica of the local environment based on the XR content and the global anchoring map from the first edge node to a second edge node, wherein the second edge node is configured to perform:
modifying, at the second edge node, the content cache and the digital replica of the local environment based on the XR content and the global anchoring map; and
transmitting, from the second edge node, the data of the content cache and the digital replica of the local environment to the viewing client.

2. The method of claim 1, comprising:
generating, at a content authoring tool, an asset and a scene description;
transmitting the asset and the scene description to a content server;
generating, at the content server, the extended reality (XR) content and the global anchoring map based on the asset and the scene description;
when the transferring the at least the portion of the modifying from the first edge node to the second edge node has not occurred, transmitting, from the content server, the XR content in accordance with the global anchoring map to the first edge node; and
when the transferring the at least the portion of the modifying from the first edge node to the second edge node has occurred, transmitting, from the content server, the XR content in accordance with the global anchoring map to the second edge node.

3. The method of claim 2, comprising:
performing content pre-processing by:
generating, at the content authoring tool, the XR content, rules of adaptation, and the global anchoring map;
generating, at the content authoring tool, XR scene data and metadata based on the XR content, the rules of adaptation, and the global anchoring map; and
transmitting, from the content authoring tool, the XR scene data and the metadata to the content server.

4. The method of claim 3, comprising:
performing content streaming by:
receiving a content request from a user device;
transmitting the content request from the user device to the viewing client;
in response to receiving the content request, collecting, at the viewing client, device capabilities and session conditions;
receiving user input from the user device;
transmitting the user input from the user device to the viewing client;
in response to receiving the user input, processing, at the viewing client, the user input, and collecting device sensor data;
transmitting, from the viewing client, the device capabilities and the session conditions to the first edge node when transferring has not occurred or to the second edge node when transferring has occurred;
transmitting, from the viewing client, the user input and the sensor data to the first edge node when transferring has not occurred or to the second edge node when transferring has occurred;
adapting, at the first edge node or the second edge node, the XR content;
transmitting, from the first edge node or the second edge node, the content request to the content server;
selecting, at the content server, the XR content based on a location of the user device and the global anchoring map;
transmitting, from the content server, the XR scene data and the metadata to the first edge node or the second edge node;
updating, at the first edge node or the second edge node, the XR scene data, and rendering a view from a standpoint of the user device;

transmitting, from the first edge node or the second edge node, streaming output to the viewing client; and transmitting, from the viewing client, the streaming output to the user device.

5. The method of claim 2, wherein the content server performs:
receiving a content request from the first edge node or the second edge node;
in response to receiving the request and the content request from the first edge node or the second edge node, determining whether the content request is based on a location;
in response to determining that the content request is based on the location, sending the XR content based on the global anchoring map; and
in response to determining that the content request is not based on the location, sending the XR content based on the content request.

6. The method of claim 1, wherein the viewing client is configured to monitor device capabilities.

7. The method of claim 6, wherein at least one of a haptics module, a graphics module, a camera module, an eye tracking module, or a user input module is configured to communicate with the viewing client, and
wherein the viewing client is configured to monitor the device capabilities of the at least one of the haptics module, the graphics module, the camera module, the eye tracking module, or the user input module.

8. The method of claim 1, wherein the viewing client is configured to transmit output to at least one of a graphics output module or a haptics output module.

9. The method of claim 1, wherein the change in the condition impacting the resource usage includes at least one of a change in a first condition of the viewing client, a change in a second condition of the first edge node, a change in a third condition of the second edge node, a change in a fourth condition of a communication network linking the viewing client with the first edge node and/or the second edge node, or a change in a fifth condition of the content.

10. The method of claim 1, wherein at least the first edge node or the second edge node is configured to perform session run-time processing based on a spatial computing server.

11. A system, comprising:
a first edge node configured to modify a content cache and a digital replica of a local environment based on extended reality (XR) content and a global anchoring map;
a viewing client; and
a second edge node configured to modify the content cache and the digital replica of the local environment based on the XR content and the global anchoring map; and
circuitry configured to:
transmit, from the first edge node, data of the content cache and the digital replica of the local environment to the viewing client;
based at least in part on a change in a condition impacting resource usage, transfer at least a portion of the modifying of the content cache and the digital replica of the local environment based on the XR content and the global anchoring map from the first edge node to the second edge node;
modify, at the second edge node, the content cache and the digital replica of the local environment based on the XR content and the global anchoring map; and
transmit, from the second edge node, the data of the content cache and the digital replica of the local environment to the viewing client.

12. The system of claim 11, comprising:
a content authoring tool configured to generate an asset and a scene description; and
a content server configured to generate the extended reality (XR) content and the global anchoring map based on the asset and the scene description,
wherein the circuitry is configured to:
transmit the asset and the scene description to the content server;
when the transferring the at least the portion of the modifying from the first edge node to the second edge node has not occurred, transmit, from the content server, the XR content in accordance with the global anchoring map to the first edge node; and
when the transferring the at least the portion of the modifying from the first edge node to the second edge node has occurred, transmit, from the content server, the XR content in accordance with the global anchoring map to the second edge node.

13. The system of claim 12, wherein the circuitry is configured to:
perform content pre-processing by:
generating, at the content authoring tool, the XR content, rules of adaptation, and the global anchoring map;
generating, at the content authoring tool, XR scene data and metadata based on the XR content, the rules of adaptation, and the global anchoring map; and
transmitting, from the content authoring tool, the XR scene data and the metadata to the content server.

14. The system of claim 13, wherein the circuitry is configured to:
perform content streaming by:
receiving a content request from a user device;
transmitting the content request from the user device to the viewing client;
in response to receiving the content request, collecting, at the viewing client, device capabilities and session conditions;
receiving user input from the user device;
transmitting the user input from the user device to the viewing client;
in response to receiving the user input, processing, at the viewing client, the user input, and collecting device sensor data;
transmitting, from the viewing client, the device capabilities and the session conditions to the first edge node when transferring has not occurred or to the second edge node when transferring has occurred;
transmitting, from the viewing client, the user input and the sensor data to the first edge node when transferring has not occurred or to the second edge node when transferring has occurred;
adapting, at the first edge node or the second edge node, the XR content;
transmitting, from the first edge node or the second edge node, the content request to the content server;
selecting, at the content server, the XR content based on a location of the user device and the global anchoring map;
transmitting, from the content server, the XR scene data and the metadata to the first edge node or the second edge node;

updating, at the first edge node or the second edge node, the XR scene data, and rendering a view from a standpoint of the user device;

transmitting, from the first edge node or the second edge node, streaming output to the viewing client; and transmitting, from the viewing client, the streaming output to the user device.

15. The system of claim 12, wherein the content server performs:

receiving a content request from the first edge node or the second edge node;

in response to receiving the request and the content request from the first edge node or the second edge node, determining whether the content request is based on a location;

in response to determining that the content request is based on the location, sending the XR content based on the global anchoring map; and in response to determining that the content request is not based on the location, sending the XR content based on the content request.

16. The system of claim 11, wherein the viewing client is configured to monitor device capabilities.

17. The system of claim 16, comprising:

at least one of a haptics module, a graphics module, a camera module, an eye tracking module, or a user input module configured to communicate with the viewing client, wherein the viewing client is configured to monitor the device capabilities of the at least one of the haptics module, the graphics module, the camera module, the eye tracking module, or the user input module.

18. The system of claim 11, wherein the viewing client is configured to transmit output to at least one of a graphics output module or a haptics output module.

19. The system of claim 11, wherein the change in the condition impacting the resource usage includes at least one of a change in a first condition of the viewing client, a change in a second condition of the first edge node, a change in a third condition of the second edge node, a change in a fourth condition of a communication network linking the viewing client with the first edge node and/or the second edge node, or a change in a fifth condition of the content.

20. The system of claim 11, wherein at least the first edge node or the second edge node is configured to perform session run-time processing based on a spatial computing server.

* * * * *